(12) United States Patent
Sugita et al.

(10) Patent No.: US 8,300,750 B2
(45) Date of Patent: Oct. 30, 2012

(54) INFORMATION PROCESSING DEVICE, SIGNAL PROCESSING METHOD, AND SIGNAL TRANSMISSION METHOD

(75) Inventors: Takehiro Sugita, Kanagawa (JP); Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 12/483,425

(22) Filed: Jun. 12, 2009

(65) Prior Publication Data

US 2010/0027728 A1   Feb. 4, 2010

(30) Foreign Application Priority Data

Jul. 31, 2008   (JP) ................. 2008-198395

(51) Int. Cl.
*H04L 7/00* (2006.01)
(52) U.S. Cl. ........................ 375/354; 327/141
(58) Field of Classification Search ........... 375/354
See application file for complete search history.

(56) References Cited

U.S. PATENT DOCUMENTS

| 7,912,143 | B1 * | 3/2011 | Graham | 375/288 |
| 2002/0140592 | A1 * | 10/2002 | Nguyen | 341/144 |
| 2004/0165677 | A1 * | 8/2004 | Shen et al. | 375/290 |
| 2006/0193372 | A1 * | 8/2006 | McCorkle et al. | 375/130 |
| 2007/0205933 | A1 * | 9/2007 | Coene et al. | 341/155 |

FOREIGN PATENT DOCUMENTS

JP   3-109843   5/1991

OTHER PUBLICATIONS

U.S. Appl. No. 12/487,892, filed Jun. 19, 2009, Fukuda et al.

* cited by examiner

*Primary Examiner* — David C. Payne
*Assistant Examiner* — Erin File
(74) *Attorney, Agent, or Firm* — Oblon, Spivak, McClelland, Maier & Neustadt, L.L.P.

(57) ABSTRACT

An information processing device includes: a signal receiving portion that receives a signal in which input data that contains first and second bit values different from one another is encoded such that the first bit value is expressed by first amplitude values and the second bit value is expressed by second amplitude values different from the first amplitude values, and such that the same amplitude value does not occur twice in succession and the polarities of the amplitude values are inverted with each cycle; a clock signal extraction portion that extracts a clock signal by detecting polarity inversions in the received signal; a clock signal subtraction portion that subtracts the extracted clock signal from the received signal; and an input data decoding portion that decodes the input data by determining the first and second bit values based on an amplitude value of the signal obtained by subtracting the clock signal.

9 Claims, 23 Drawing Sheets

EXAMPLE OF CIRCUIT CONFIGURATION OF CLOCK DETECTION PORTION 332

FIG. 14

DETERMINATION TABLE FOR DATA DETERMINATION (STORAGE PORTION 364)

| COMPARATOR 354 | COMPARATOR 356 | COMPARATOR 358 | COMPARATOR 360 | OUTPUT DATA |
|---|---|---|---|---|
| 1 | 1 | 1 | 1 | 1 |
| 0 | 1 | 1 | 1 | 0 |
| 0 | 0 | 1 | 1 | 1 |
| 0 | 0 | 0 | 1 | 0 |
| 0 | 0 | 0 | 0 | 1 |

EXAMPLE OF CIRCUIT CONFIGURATION OF DECODING PROCESSING PORTION 402

FIG. 18

DETERMINATION TABLE FOR DATA DETERMINATION
(STORAGE PORTION 424)

| COMPARATOR 418 | COMPARATOR 420 | OUTPUT DATA |
|---|---|---|
| 1 | 1 | 1 |
| 0 | 1 | 0 |
| 0 | 0 | 1 |

INFORMATION PROCESSING DEVICE, SIGNAL PROCESSING METHOD, AND SIGNAL TRANSMISSION METHOD

BACKGROUND OF THE INVENTION

1. Field of the Invention

The present invention relates to an information processing device, a signal processing method, and a signal transmission method.

2. Description of the Related Art

Most mobile terminals that are typified by mobile telephones and the like use a movable member for a connecting portion between an operation portion that a user operates and a display portion on which information is displayed. Typical examples include the opening and closing structures and the like of folding-type mobile telephones. Furthermore, in addition to telephone functions and e-mail functions, recent mobile telephones are provided with functions for watching and listening to videos, functions for taking photographs, and the like that require the connecting portion described above to be moved in complicated ways according to the user's purpose. For example, in a case where the mobile telephone is used to watch and listen to a video, it is conceivable that the user would want to turn the display portion toward himself and to stow the operation portion, which is not necessary for watching and listening. Thus a structure is required by which the position and orientation of the display portion can be easily changed according to the purpose, such as when the mobile telephone is used as a telephone, when it is used as a digital camera, when it is used as a television receiver, and the like.

However, a large number of signal lines and electric power lines pass through the connecting portion between the operation portion and the display portion. For example, dozens of wires are connected in parallel in the display portion (refer to FIG. 1). Therefore, when a movable member that can be moved in a complicated manner like that described above is used for the connecting portion, the reliability and the like of the wiring diminishes considerably. For this reason, the technology has been shifting from a parallel transmission method to a serial transmission method (refer to FIG. 2) in order to decrease the number of signal lines in the connecting portion. Of course, technological shifts for the same kinds of reasons are not limited to the realm of mobile telephones, but are also occurring in a wide variety of electronic devices for which complicated wiring is required. Note that an additional reason for the shift to serial transmission is to reduce electromagnetic interference (EMI).

In a serial transmission method like that described above, the transmission data is transmitted after being encoded by a specified method. The encoding method that is used may be, for example, the non-return to zero (NRZ) encoding method, the Manchester encoding method, the Alternate Mark Inversion (AMI) encoding method, or the like. For example, in Japanese Patent Application Publication No. JP-A-3-109843, a data transmission technology is disclosed that uses the AMI code, which is a representative example of a bipolar code. In the same document, another technology is disclosed by which a data clock is expressed by an intermediate value of the signal level and transmitted, and the data clock is then regenerated on the receiving side based on the signal level.

SUMMARY OF THE INVENTION

Among the encoding methods that are described above, the NRZ encoding method produces a signal that contains a direct current component. It is therefore difficult to transmit the NRZ-encoded signal together with a direct current component such as the power supply or the like. On the other hand, the signals that are produced by the Manchester encoding method and the AMI encoding method do not contain a direct current component. It is therefore possible to transmit the signals together with a direct current component such as the power supply or the like. However, the Manchester encoding method and the AMI encoding method make it necessary to have a phase-locked loop (PLL) circuit on the receiving side in order to regenerate the data clock of the signal. However, providing the PLL circuit on the receiving side increases the amount of electric current that is consumed. Moreover, with the Manchester encoding method, the data is transmitted by raising and lowering the amplitude, so it is necessary to transmit a clock that is two times the data rate. The resulting high clock operation increases the amount of electric current that is consumed.

A technology has been developed that addresses these problems by generating and transmitting a signal that does not contain a direct current component and does not require a PLL circuit when the clock is regenerated. The technology takes input data that contains mutually different first and second bit values, then encodes and transmits the data by expressing the first bit value in the form of a plurality of first amplitude values and expressing the second bit value in the form of second amplitude values that differ from the first amplitude values, such that the same amplitude value does not occur twice in succession and the polarity of the amplitude values is inverted with each cycle. However, in order to determine the first and second bit values based on the transmission signal that is encoded by using this technology, it is necessary to repeat a threshold value determination process many times.

Accordingly, the present invention addresses the problems that are described above and provides an information processing device, a signal processing method, and a signal transmission method that are new and improved and that are capable of reducing the number of times that it is necessary to perform a threshold value determination process that is performed when a bit value is decoded from a code that does not contain a direct current component and does not require a PLL circuit when the clock is regenerated.

In order to solve the above issues, according to an embodiment of the present invention, there is provided an information processing device that includes a signal receiving portion that receives a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle. Further, the information processing device includes: a clock signal extraction portion that extracts a clock signal by detecting polarity inversions in the signal received by the signal receiving portion; a clock signal subtraction portion that subtracts, from the signal received by the signal receiving portion, the clock signal extracted by the clock signal extraction portion; and an input data decoding portion that decodes the input data by determining the first and second bit values based on an amplitude value of the signal that has been obtained by the clock signal subtraction portion subtracting the clock signal.

In the signal received by the signal receiving portion, the first bit value may be expressed by an amplitude value of zero, and the second bit value may be obtained by adding a clock signal to an encoded signal X with a transmission speed of Fb that is expressed by repetition of amplitude values A and −A, where A is a given real number, the clock signal having an amplitude value of n*A, where n is larger than one, and having a frequency of Fb/2.

The clock signal extraction portion may be a comparator that has, as a threshold value, a median amplitude value of the signal that has been obtained by the clock signal subtraction portion subtracting the clock signal.

The input data decoding portion may include: a first comparator that determines whether the amplitude value of the signal that has been obtained by the clock signal subtraction portion subtracting the clock signal is larger than a threshold value L1, where L1 is larger than zero and equal to or smaller than A; and a second comparator that determines whether the amplitude value of the signal is larger than a threshold value L2, where L2 is equal to or larger than −A and smaller than zero. The input data decoding portion may decode the input data by determining one of the first bit value and the second bit value in accordance with combination of determination results of the first and second comparators.

The above-described information processing device may further include a signal transmission portion that transmits, in synchronization with the clock signal extracted by the clock signal extraction portion, a signal in which input data that contains third and fourth bit values that differ from one another is encoded such that the third bit value is expressed by a plurality of third amplitude values and the fourth bit value is expressed by a plurality of fourth amplitude values that differ from the third amplitude values, the input data also being encoded such that the same amplitude value does not occur twice in succession and such that the polarities of the amplitude values are inverted with each cycle.

The clock signal extraction portion may include an amplitude adjusting portion that adjusts the amplitude value of the clock signal to n*A.

In order to solve the above issues, according to another embodiment of the present invention, there is provided an information processing device that includes a first information processing module and a second information processing module. The first information processing module includes: a clock signal generating portion that generates a clock signal that is used to transmit a signal; an encoding portion that generates, by using the clock signal generated by the clock signal generating portion, a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle; and a signal transmission portion that transmits the signal generated by the encoding portion to a second information processing module. Further, the first information processing module includes: a signal receiving portion that receives the signal transmitted from the second information processing module; a clock signal subtraction portion that subtracts, from the signal received by the signal receiving portion, the clock signal generated by the clock signal generating portion; and a bit value determination portion that determines third and fourth bit values that differ from one another, based on an amplitude value of the signal that has been obtained by the clock signal subtraction portion subtracting the clock signal. The second information processing module includes: a signal receiving portion that receives the signal transmitted from the first information processing module; a clock signal extraction portion that extracts a clock signal by detecting polarity inversions in the signal received by the signal receiving portion; and a signal transmission portion that transmits to the first information processing module, in synchronization with the clock signal extracted by the clock signal extraction portion, a signal in which input data that contains third and fourth bit values that differ from one another is encoded such that the third bit value is expressed by a plurality of third amplitude values and the fourth bit value is expressed by a plurality of fourth amplitude values that differ from the third amplitude values, the input data also being encoded such that the same amplitude value does not occur twice in succession and such that the polarities of the amplitude values are inverted with each cycle.

In order to solve the above issues, according to another embodiment of the present invention, there is provided a signal processing method that includes the steps of: receiving a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle; extracting a clock signal by detecting polarity inversions in the received signal; subtracting the extracted clock signal from the received signal; and decoding the input data by determining the first and second bit values based on the signal that has been obtained by subtracting the clock signal.

In order to solve the above issues, according to another embodiment of the present invention, there is provided a signal transmission method that includes the steps of: generating a clock signal that is used to transmit a signal, the clock signal being generated by a first information processing module; generating, by using the generated clock signal, a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle, the signal being generated by the first information processing module; and transmitting the generated signal to a second information processing module, the signal being transmitted by the first information processing module. Further, the signal transmission method includes the steps of: receiving the signal that has been transmitted by the first information processing module, the signal being received by the second information processing module; extracting the clock signal by detecting polarity inversions in the received signal, the clock signal being extracted by the second information processing module; and transmitting to the first information processing module, in synchronization with the extracted clock signal, a signal in which input data that contains third and fourth bit values that differ from one another is encoded such that the third bit value is expressed by a plurality of third amplitude values and the fourth bit value is expressed by a plurality of fourth amplitude values that differ from the third amplitude values, the input data also being encoded such that the same amplitude value does not occur twice in succession and such that the polarities of the amplitude values are inverted with each cycle, the signal being transmitted by the second information processing module.

Furthermore, the signal transmission method includes the steps of: receiving the signal that has been transmitted by the second information processing module, the signal being received by the first information processing module; subtracting the generated clock signal from the signal that has been transmitted by the second information processing module, the clock signal being subtracted by the first information processing module; and determining the third and fourth bit values that differ from one another, based on an amplitude value of the signal that has been obtained by the first information processing module subtracting the clock signal, the third and fourth bit values being determined by the first information processing module.

In order to solve the above issues, according to another embodiment of the present invention, a program can be provided that includes instructions that command a computer to perform functions of the above-described information processing device. Further, a storage medium can be provided that is readable by a computer that stores the program.

According to the embodiments of the present invention described above, it is possible to reduce the number of times that it is necessary to perform the threshold value determination process that is performed when a bit value is decoded from the code that does not contain a direct current component and does not require a PLL circuit when the clock is regenerated. As a result, the computing load on a coding process of the bit value can be reduced. In addition, the scale of the circuit used for threshold value determination can be reduced.

BRIEF DESCRIPTION OF THE DRAWINGS

FIG. 14 is an explanatory figure that shows an example of a configuration of a determination table for data determination;

FIG. 18 is an explanatory figure that shows an example of a determination table for data determination according to the embodiment;

DETAILED DESCRIPTION OF THE PREFERRED EMBODIMENTS

Figure 1:
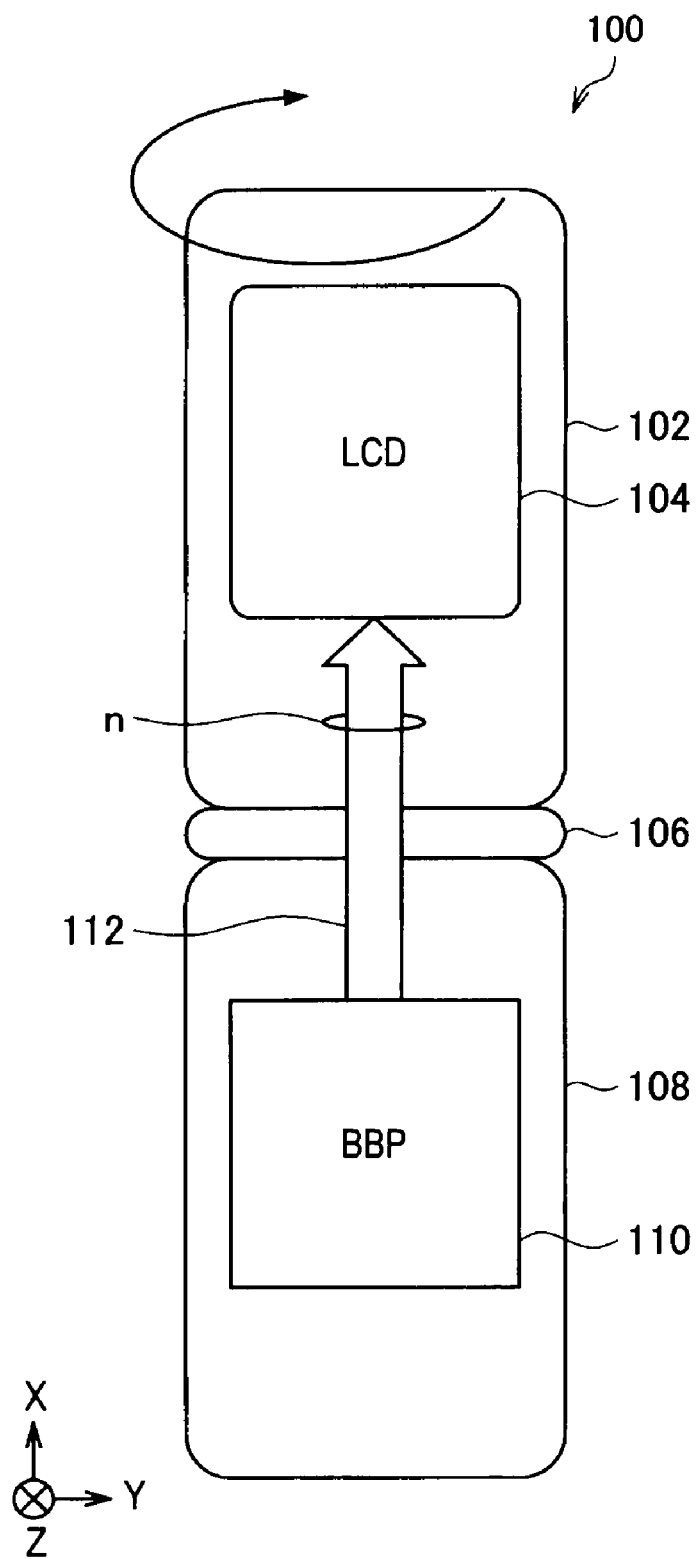
FIG. 1 is an explanatory figure that shows an example of a configuration of a mobile terminal.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Flow of Explanation

The flow of the explanation of the embodiments of the present invention that are hereinafter described will be briefly explained. First, the technical issues facing mobile telephones and the like that use a parallel transmission method will be briefly explained with reference to FIG. 1. Next, the issues facing signal transmission technologies that use a serial transmission method will be explained with reference to FIGS. 2 to 8. Next, a new signal transmission technology that has been conceived for the purpose of resolving the issues facing signal transmission technologies that use a serial transmission method will be explained with reference to FIGS. 9 to 11.

The above-described new signal transmission technology relates to a method for transmitting a signal using a code that does not contain a direct current component and does not require a PLL circuit when the clock is regenerated. The embodiment of the present invention relates to a technology that, when this sort of code is used, increases efficiency of a decoding process performed when a bit value is extracted from a signal. Before describing this new technology, the decoding process performed using the above-described new signal transmission method will be described with reference to FIG. 12 to FIG. 15.

A configuration and a signal processing method of a mobile terminal according to an embodiment of the present invention will be explained with reference to FIGS. 16 to 19 in light of the technological features of the new signal transmission technology described above. Further, effects obtained from the above-described new technology will be described with reference to FIG. 20. Then, a functional configuration and the like of a mobile terminal according to an applied example of the embodiment will be described with reference to FIG. 21 and FIG. 22. Next, the technical concepts of the embodiment and the effects of applying those technical concepts will be briefly explained. Finally, an example of a hardware configuration of a terminal device that utilizes the technology according to the embodiment will be explained with reference to FIG. 23.

Summary of Issues

First, before the technology according to the embodiment of the present invention is explained in detail, the issues to be resolved by the embodiment will be briefly explained.

Parallel Transmission Method

First, an example of a configuration of a mobile terminal 100 that uses the parallel transmission method will be briefly explained with reference to FIG. 1. FIG. 1 is an explanatory figure that shows the example of the configuration of the mobile terminal 100 that uses the parallel transmission method. Note that in FIG. 1, a mobile telephone is schematically illustrated as an example of the mobile terminal 100. However, the scope of use of the technology according to the explanation that follows is not limited to a mobile telephone.

As shown in FIG. 1, the mobile terminal 100 is mainly configured from a display portion 102, a liquid crystal display (LCD) 104, a connecting portion 106, an operation portion 108, a base band processor (BBP) 110, and a parallel signal path 112. Note that in some cases, the display portion 102 is called a display side (D), and the operation portion 108 is called a main body side (M). Furthermore, in the explanation that follows, an example will be explained of a case in which a video signal is transmitted from the main body side to the display side. Of course, the technology that is described below is not limited to this example.

As shown in FIG. 1, the LCD 104 is provided in the display portion 102. A video signal that is transmitted through the parallel signal path 112 is displayed on the LCD 104. The connecting portion 106 is a member that connects the display portion 102 and the operation portion 108. The connecting member that forms the connecting portion 106 has a structure that can rotate the display portion 102 180 degrees within the Z-Y plane. The connecting member also has a structure that is formed such that the display portion 102 can be rotated within the X-Z plane such that the mobile terminal 100 can be folded up. Note that the connecting member may also have a structure that allows the display portion 102 to move freely in any direction.

The BBP 110 is a computational processing portion that provides the mobile terminal 100 with a communication control function and an application execution function. A parallel signal that is output from the BBP 110 is transmitted through the parallel signal path 112 to the LCD 104 of the display portion 102. The parallel signal path 112 is provided with a plurality of signal lines. In the case of a mobile telephone, for example, the number n of the signal lines is approximately fifty lines. The video signal transmission speed is approximately 130 Mbps in a case where the resolution of the LCD 104 is QVGA. The parallel signal path 112 is wired such that the lines pass through the connecting portion 106.

In other words, the plurality of signal lines that form the parallel signal path 112 are provided in the connecting portion 106. As described earlier, if the range of movement of the connecting portion 106 is increased, the risk increases that the movement will inflict damage on the parallel signal path 112. This would result in impairment of the reliability of the parallel signal path 112. On the other hand, if the reliability of the parallel signal path 112 is maintained, the range of movement of the connecting portion 106 will be restricted. It is for this reason that the serial transmission method has come to be widely used in mobile telephones and the like in order to maintain the reliability of the parallel signal path 112 while also increasing the degree of freedom of the movable member that forms the connecting portion 106. The shift to the serial transmission method for the transmission path is also being promoted from the standpoint of EMI.

Serial Transmission Method

Figure 2:
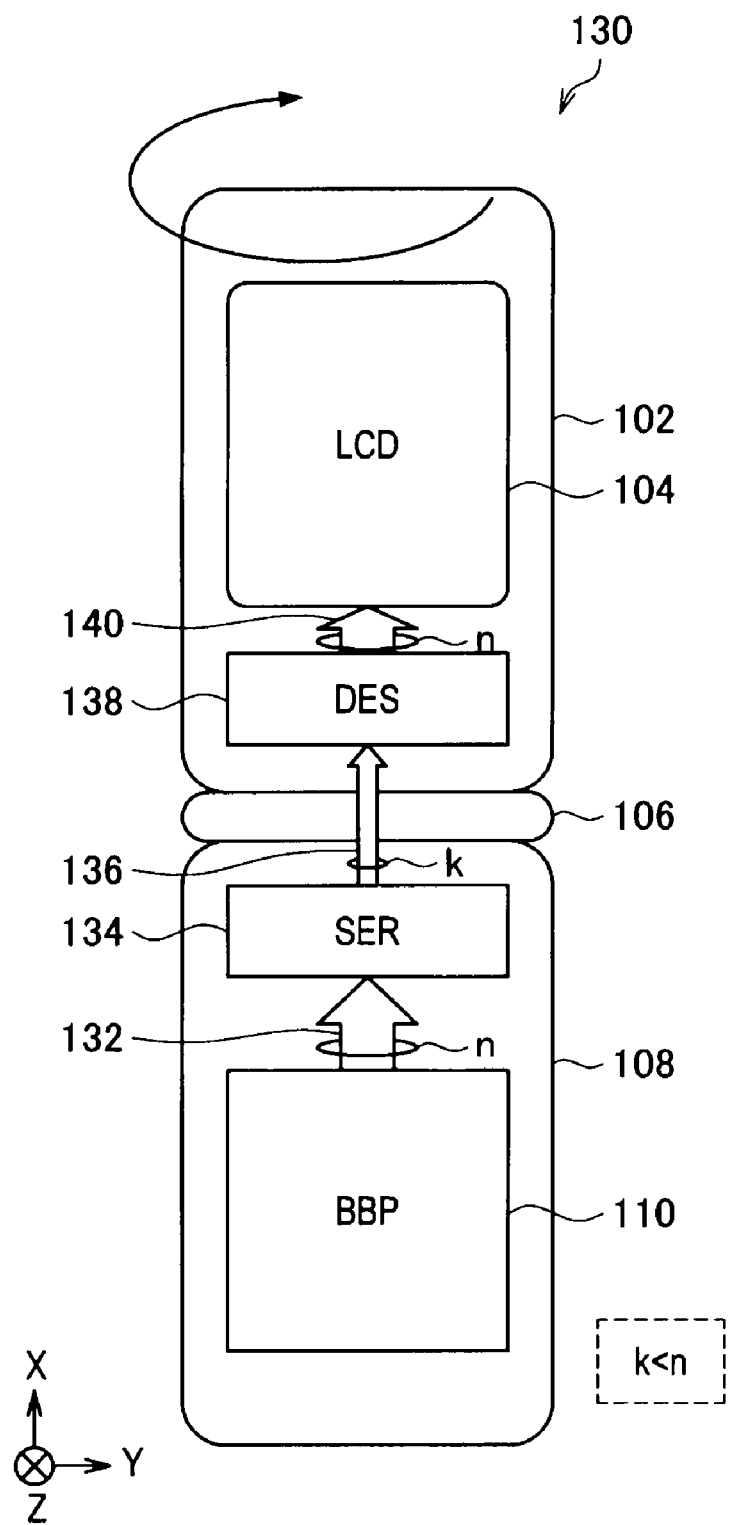
FIG. 2 is an explanatory figure that shows an example of a configuration of a mobile terminal.

Now an example of a configuration of a mobile terminal 130 that uses the serial transmission method will be briefly explained with reference to FIG. 2. FIG. 2 is an explanatory figure that shows the example of the configuration of the mobile terminal 130 that uses the serial transmission method. Note that in FIG. 2, a mobile telephone is schematically illustrated as an example of the mobile terminal 130. However, the scope of use of the technology according to the explanation that follows is not limited to a mobile telephone. Note also that configuring elements of the mobile terminal 130 that have substantially the same function as in the mobile terminal 100 that uses the parallel transmission method and is shown in FIG. 1 are denoted by the same reference numerals and detailed explanations will be omitted.

As shown in FIG. 2, the mobile terminal 130 is mainly configured from the display portion 102, the LCD 104, the connecting portion 106, the operation portion 108, the BBP 110, parallel signal paths 132, 140, a serializer 134, a serial signal path 136, and a deserializer 138.

Unlike the mobile terminal 100 that is described above, the mobile terminal 130 transmits the video signal by the serial transmission method through the serial signal path 136 that is wired through the connecting portion 106. Therefore, the serializer 134 is provided in the operation portion 108 to serialize the parallel signal that is output from the BBP 110. On the other end, the deserializer 138 is provided in the display portion 102 to parallelize the serial signal that is transmitted through the serial signal path 136.

The serializer 134 converts the parallel signal that is output from the BBP 110 and input through the parallel signal path 132 into a serial signal. The serial signal that has been converted by the serializer 134 is input to the deserializer 138 through the serial signal path 136. Next, the deserializer 138 restores the input serial signal to the original parallel signal and inputs it to the LCD 104 through the parallel signal path 140.

In the serial signal path 136, a data signal that is encoded by the NRZ encoding method, for example, may be transmitted on its own, and alternatively, the data signal and a clock signal may be transmitted together. The number k of the lines in the serial signal path 136 is significantly less than the number n of the lines in the parallel signal path 112 in the mobile terminal 100 in FIG. 1 ($1 \leq k \ll n$). For example, the number k of the lines can be reduced to only a few lines. Therefore, the degree of freedom of the connecting portion 106 through which the serial signal path 136 passes can be said to be very much greater than that of the connecting portion 106 through which the parallel signal path 112 passes. At the same time, it can also be said that the reliability of the serial signal path 136 is high. Note that ordinarily, a differential signal such as a low voltage differential signal (LVDS) or the like is used for the serial signal that flows through the serial signal path 136.

Functional Configuration

Figure 3:
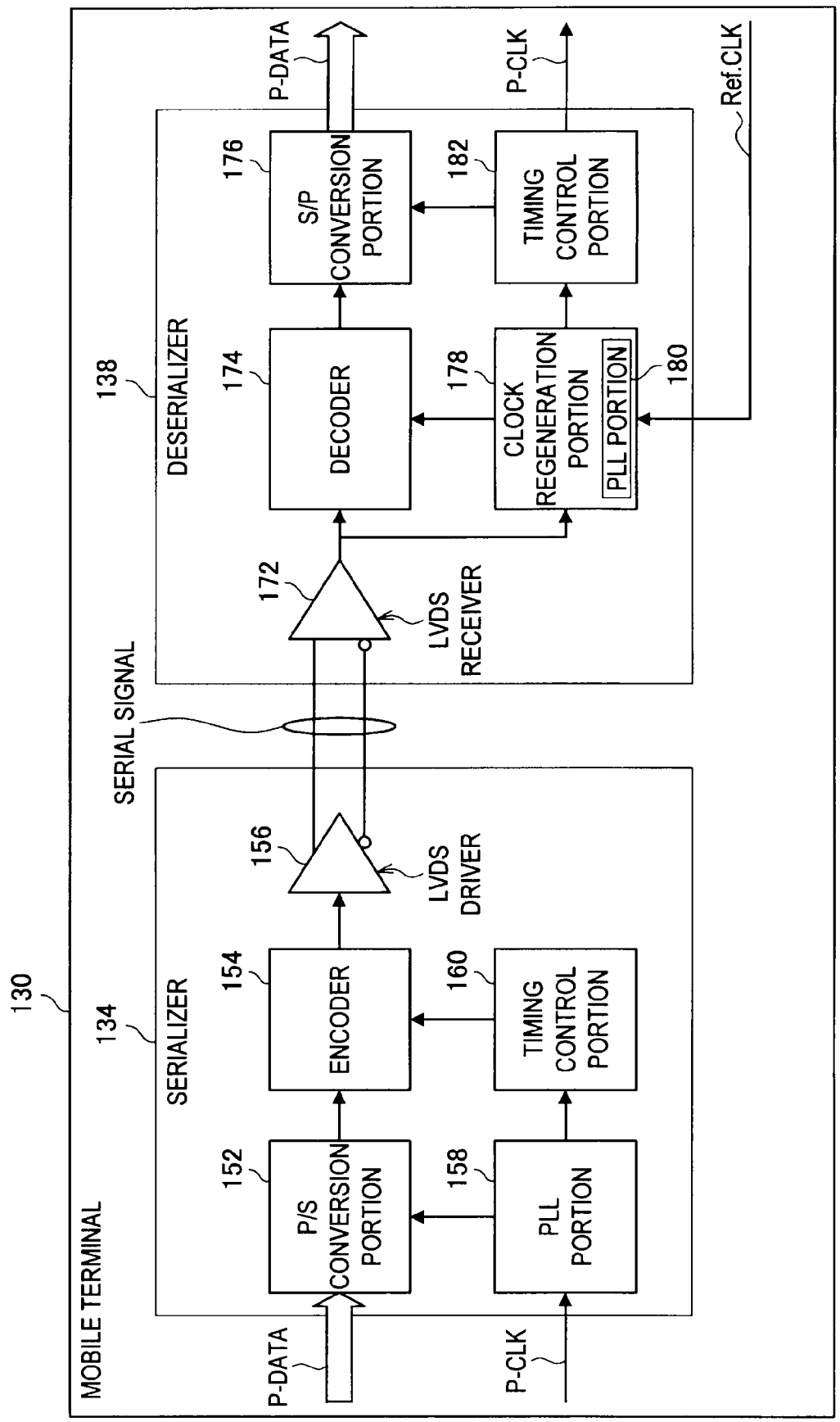
FIG. 3 is an explanatory figure that shows an example of a functional configuration of a mobile terminal that uses serial transmission.

Next, a functional configuration of the mobile terminal 130 that uses the serial transmission method will be explained with reference to FIG. 3. FIG. 3 is an explanatory figure that shows an example of the functional configuration of the mobile terminal 130 that uses the serial transmission method. However, FIG. 3 is an explanatory figure that mainly illustrates the functional configurations of the serializer 134 and the deserializer 138, so descriptions of the other configuring elements will be omitted.

Serializer 134

As shown in FIG. 3, the serializer 134 is configured from a P/S conversion portion 152, an encoder 154, an LVDS driver 156, a PLL portion 158, and a timing control portion 160.

As shown in FIG. 3, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154. The encoder 154 appends a header and the like to the serial signal and inputs it to the LVDS driver 156. The LVDS driver 156 transmits the input serial signal to the deserializer 138 by a differential transmission method according to LVDS.

In contrast, the parallel signal clock that is input to the serializer 134 is input to the PLL portion 158. The PLL portion 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 3, the deserializer 138 is mainly configured from a receiver 172, a decoder 174, an S/P conversion portion 176, a clock regeneration portion 178, a PLL portion 180, and a timing control portion 182.

As shown in FIG. 3, the serial signal is transmitted to the deserializer 138 by the differential transmission method according to LVDS. The serial signal is received by the receiver 172. The serial signal that is received by the receiver 172 is input to the decoder 174 and to the clock regeneration portion 178. The decoder 174 detects the beginning portion of the data by referring to the header in the input serial signal and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL portion 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the parallel signal (P-DATA) and the parallel signal clock (P-CLK) that are input to the serializer 134 from the BBP 110 are converted into the serial signals and transmitted to the deserializer 138. The input serial signals are then restored by the deserializer 138 to the original parallel signal and parallel signal clock and are output to the LCD 104.

As in the mobile terminal 130 that is explained above, the transmission path is serialized by converting the parallel signal into the serial signal and transmitting the serial signal. The range of movement of the portion through which the serial signal path passes is enlarged as a result, and the degree of freedom in the disposition of the display portion 102 is increased. Therefore, in a case where the mobile terminal 130 is used to watch and listen to a television broadcast or the like, for example, it is possible to transform the mobile terminal 130 such that the display portion 102 is disposed in a landscape orientation from the user's point of view. The increase in the degree of freedom brings with it a wider range of uses for the mobile terminal 130, such that with the addition of various types of communication terminal functions, a wide variety of uses becomes possible, such as watching videos, listening to music, and the like.

Figure 4A:
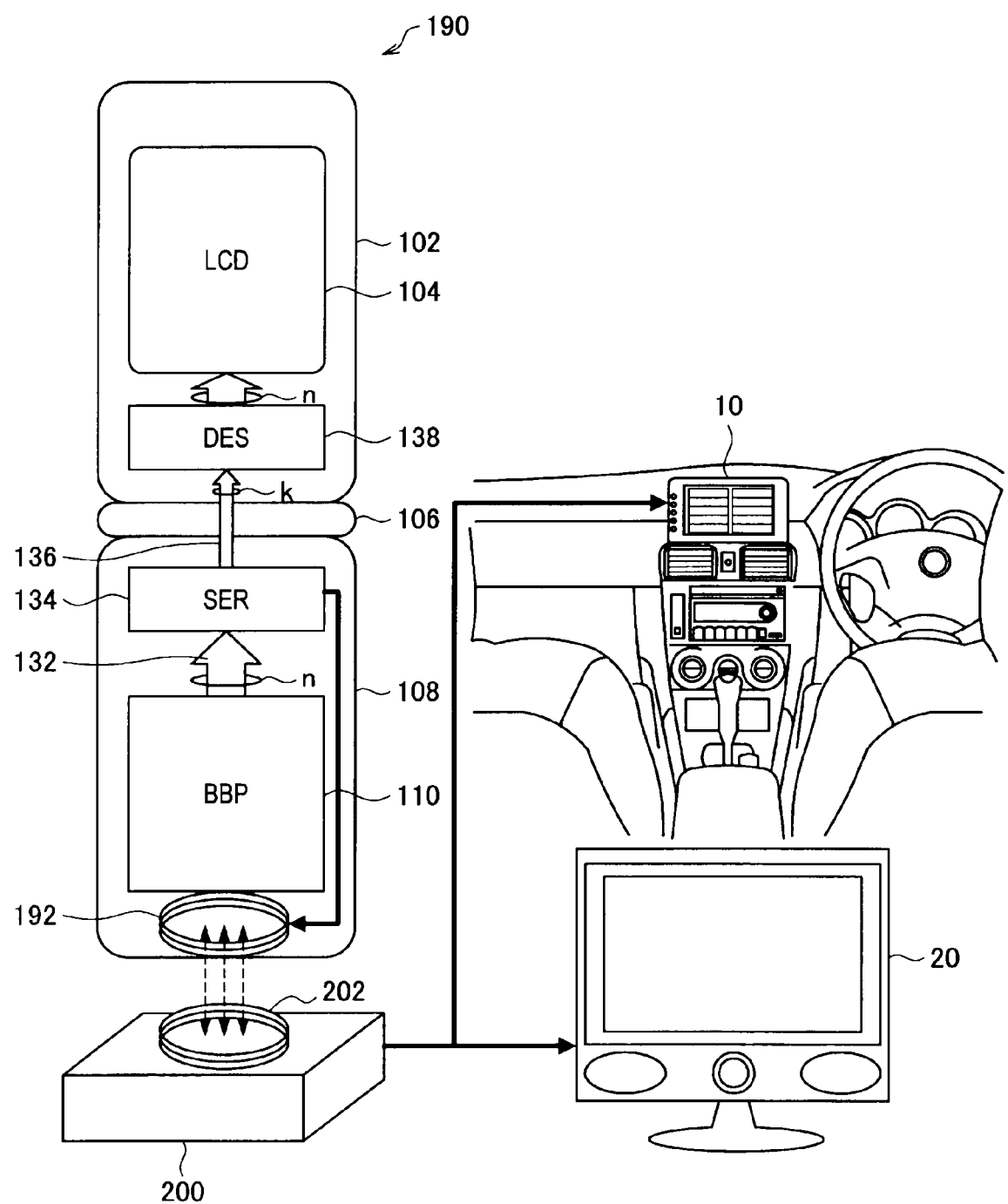
FIG. 4A is an explanatory figure that shows an example of a configuration of a mobile terminal.

Against this backdrop, the LCD 104 of the mobile terminal 130 has come to be provided with higher density that makes a more detailed display possible, such that large amounts of information can be displayed in the form of small text characters and video images. However, the small text characters and video images are difficult for the user to see. Accordingly, there is user demand for the text characters and video images that are displayed on the LCD 104 of the mobile terminal 130 to be output to a large screen, such as an externally provided television receiver, display device, or the like. In response to the demand, output configurations have been proposed such as that of a mobile terminal 190 that is shown in FIG. 4A. This output configuration will be briefly explained below.

USE EXAMPLE 1

External Output Method that uses Electromagnetic Coupling

First, refer to FIG. 4A. FIG. 4A is an explanatory figure that shows an example of a configuration of the mobile terminal 190 that is capable of using electromagnetic coupling to transmit data such as video or the like to an external output device. The external output device may be a car navigation system 10, a television receiver 20, or the like. Additional examples of the external output device include a display device for a personal computer, a projector that projects video onto a screen, and the like.

As shown in FIG. 4A, a signal reading device 200 is used to transmit data such as video or the like to the external output device. The signal reading device 200 may be connected to the car navigation system 10, the television receiver 20, or the like, and it may also be built into the devices. Signals are transmitted between the mobile terminal 190 and the signal reading device 200 using electromagnetic coupling. A coil 192 is provided in the mobile terminal 190 for that purpose. Further, a coil 202 is provided in the signal reading device 200.

Consider, for example, an operation in a case where a video signal is transmitted from the mobile terminal 190 to the television receiver 20. First, in the mobile terminal 190, the BBP 110 generates a parallel signal in order to transmit the video signal by parallel transmission. The parallel signal is then transmitted through the parallel signal path 132 to the serializer 134. The serializer 134 converts the transmitted parallel signal into a serial signal and transmits it through the serial signal path 136. At this point, an electric current signal that corresponds to the serial signal is applied to the coil 192, and an electromagnetic field is generated by the coil 192. The electromagnetic field induces an electric current to flow in the coil 202 of the signal reading device 200, and the serial signal is demodulated based on the electric current.

In this manner, the electromagnetic coupling between the mobile terminal 190 and the signal reading device 200 is used to transmit the serial signal that corresponds to the video signal. Of course, the serial signal is transmitted after being encoded by a specified encoding method and modulated by a specified modulation method, such as amplitude shift keying (ASK) or the like. However, a signal that is encoded by the NRZ encoding method contains a direct current component, so it is not suitable for signal transmission using electromagnetic coupling. Therefore, one of the Manchester encoding method and another method that does not contain a direct current component in the encoded signal is used for signal transmission by electromagnetic coupling.

In the example is FIG. 4A, the serial signal is encoded by the serializer 134 according to the Manchester encoding method and transmitted using electromagnetic coupling. In this case, it is appropriate for the decoding in the signal reading device 200 to be done in accordance with the Manchester encoding method. Therefore, the signal reading device 200 receives the encoded signal and decodes into the serial signal, then converts the serial signal into a parallel signal and outputs it to the television receiver 20. In the Manchester code, "1" is transmitted as "10", and "0" is transmitted as "01", so a transmission speed is required that is twice that of a method that simply transmits "1" and "0". However, because the Manchester code does not contain a direct current component and the clock is easily extracted, it is well suited to signal transmission using electromagnetic coupling.

Figure 4B:
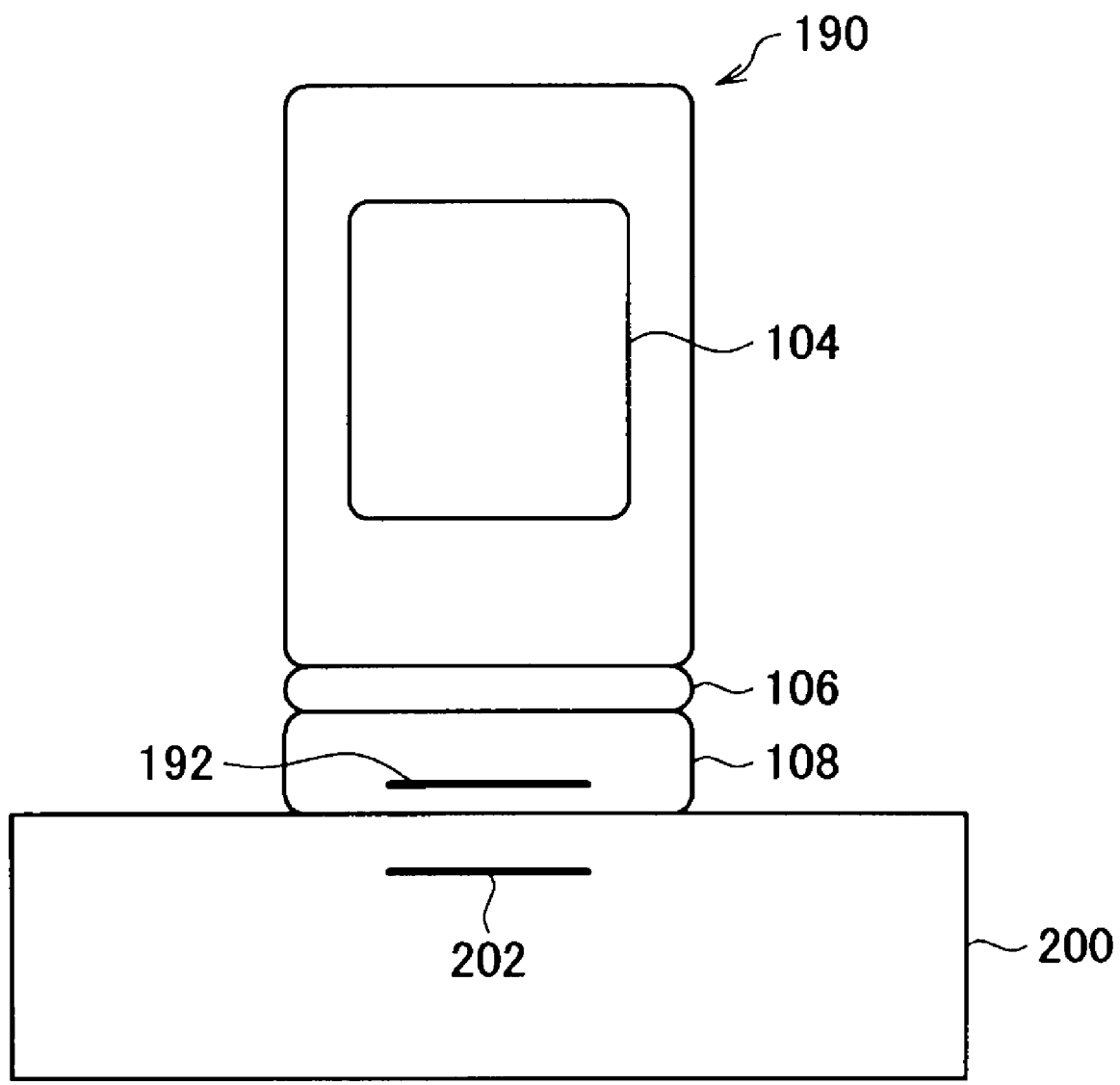
FIG. 4B is an explanatory figure that shows a state of connection between the mobile terminal and a signal reading device.

Incidentally, the signal transmission between the mobile terminal 190 and the signal reading device 200 is performed by placing them in close proximity to one another, as shown in FIG. 4B. Communication that is performed in this sort of configuration is called non-contact communication in some cases. In the example in FIG. 4B, the display portion 102 of the mobile terminal 190 is disposed in an open state, but the display portion 102 may also be disposed in a closed state. In most cases, the power supply to the LCD 104 is turned off when the display portion 102 of the mobile terminal 190 is closed, so this saves on power consumption. At this time, a mode is set that enables data transmission to the external output device even though the display portion 102 is in a closed state.

Functional Configuration: Mobile Terminal 190

Figure 5:
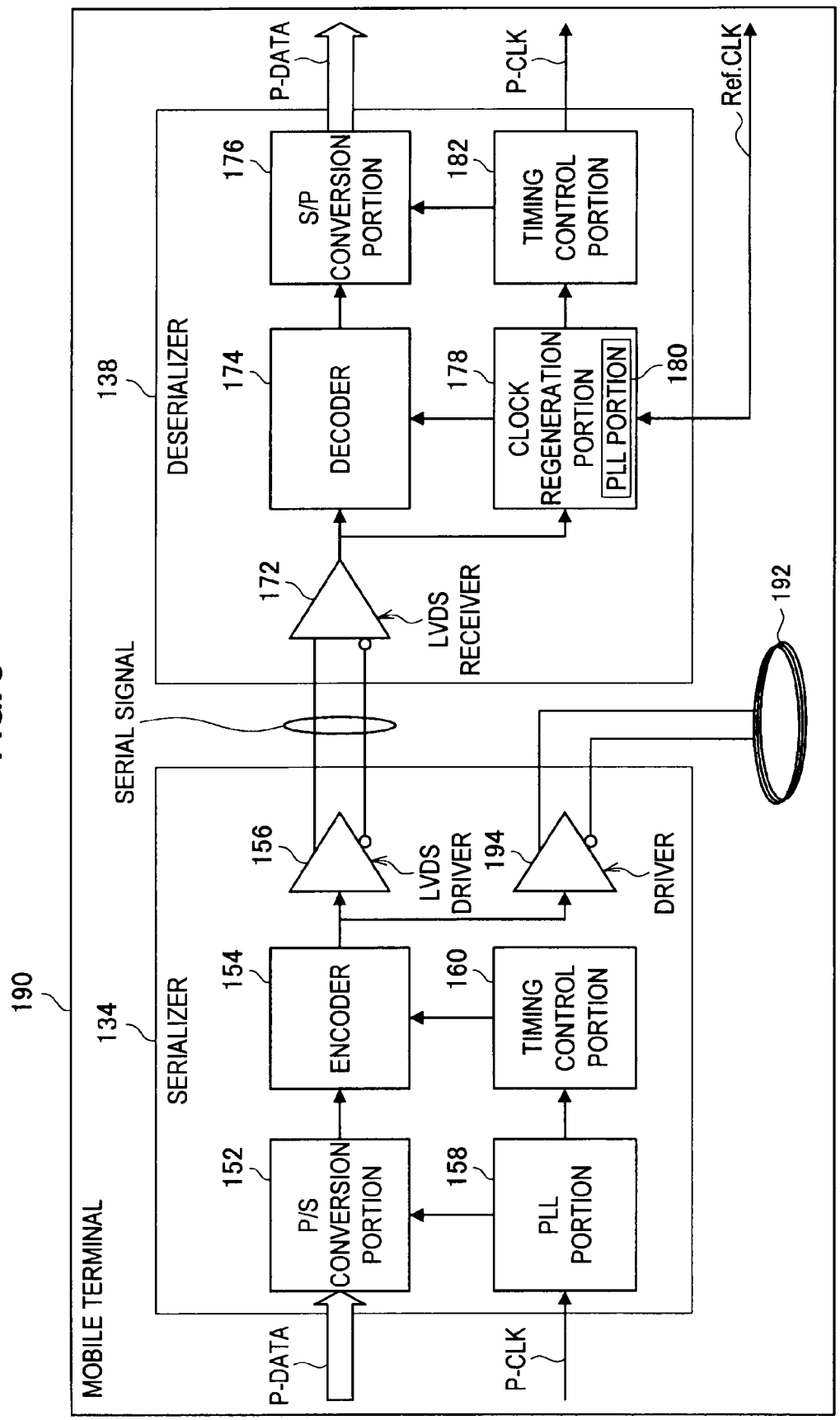
FIG. 5 is an explanatory figure that shows an example of a functional configuration of a mobile terminal that uses serial transmission.

Next, a functional configuration of the mobile terminal 190 will be briefly explained with reference to FIG. 5. FIG. 5 is an explanatory figure that shows an example of the functional configuration of the mobile terminal 190. However, FIG. 5 is an explanatory figure that mainly illustrates the functional configurations of the serializer 134 and the deserializer 138, so descriptions of the other configuring elements will be omitted. Note also that configuring elements of the mobile terminal 190 that have substantially the same function as in the mobile terminal 130 that has already been described are denoted by the same reference numerals and detailed explanations will be omitted.

Serializer 134

As shown in FIG. 5, the serializer 134 is configured from the P/S conversion portion 152, the encoder 154, the LVDS driver 156, the PLL portion 158, the timing control portion 160, and a driver 194.

As shown in FIG. 5, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154.

The encoder 154 appends a header and the like to the serial signal, encodes the serial signal by the Manchester encoding method, and inputs the serial signal to the LVDS driver 156 and the driver 194. The LVDS driver 156 transmits the input serial signal to the deserializer 138 by a differential transmission method according to LVDS. For its part, the driver 194, using electromagnetic coupling by the coil 192, transmits the input serial signal to the signal reading device 200.

In contrast, the parallel signal clock that is input to the serializer 134 is input to the PLL portion 158. The PLL portion 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 5, the deserializer 138 is mainly configured from the receiver 172, the decoder 174, the S/P conversion portion 176, the clock regeneration portion 178, the PLL portion 180, and the timing control portion 182.

As shown in FIG. 5, the serial signal is transmitted to the deserializer 138 from the serializer 134 by the differential transmission method according to LVDS. The serial signal is received by the receiver 172. The serial signal that is received by the receiver 172 is input to the decoder 174 and to the clock regeneration portion 178. The decoder 174 detects the beginning portion of the data by referring to the header in the input serial signal, decodes the serial signal that was encoded by the Manchester encoding method, and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL portion 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the parallel signal (P-DATA) and the parallel signal clock (P-CLK) that are input to the serializer 134 from the BBP 110 are converted into the serial signals and transmitted to the deserializer 138. The input serial signals are then restored by the deserializer 138 to the original parallel signal and parallel signal clock and are output to the LCD 104.

Functional Configuration: Signal Reading Device 200

Figure 6:
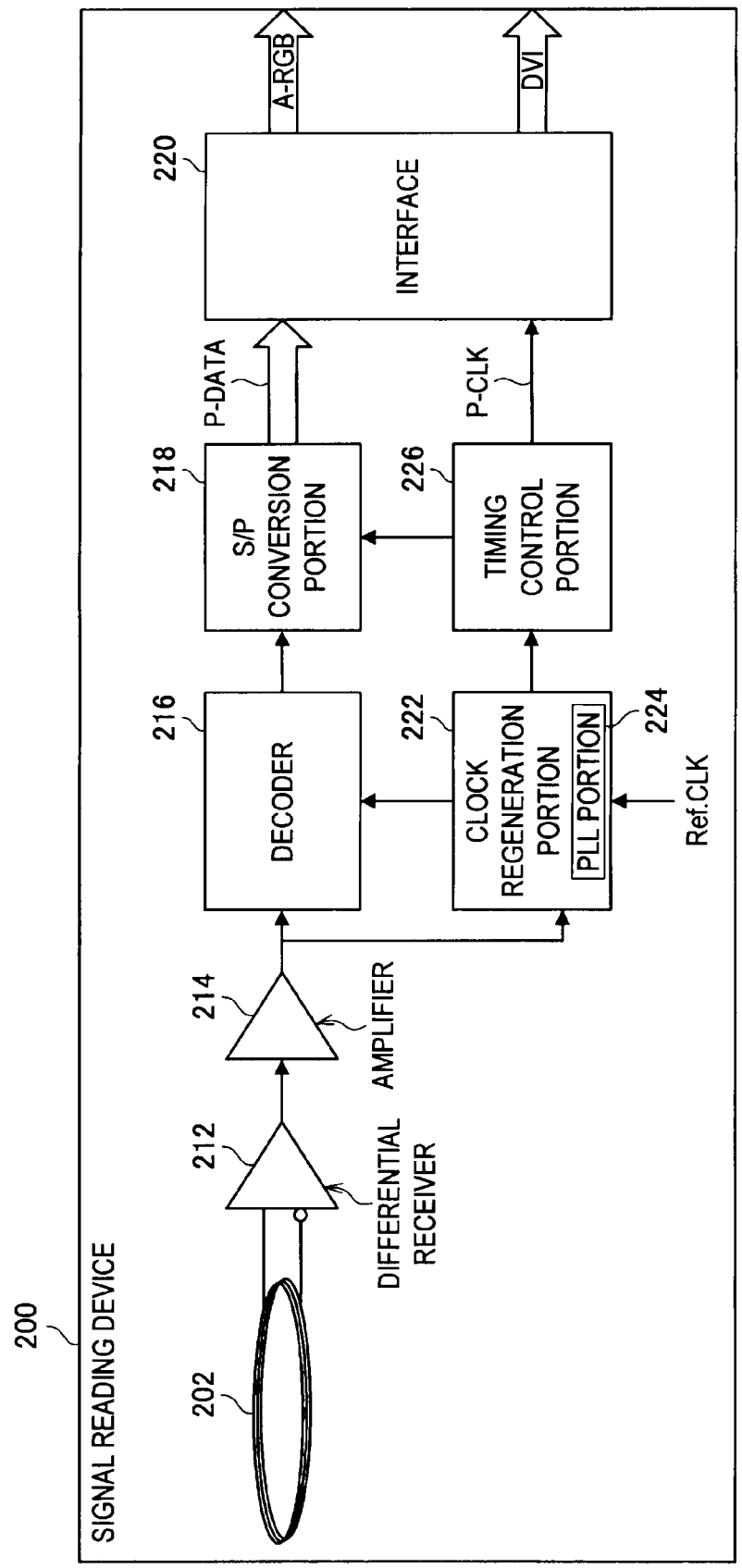
FIG. 6 is an explanatory figure that shows an example of a functional configuration of a signal reading device that uses serial transmission.

Next, a functional configuration of the signal reading device 200 will be briefly explained with reference to FIG. 6. FIG. 6 is an explanatory figure that shows an example of the functional configuration of the signal reading device 200.

As shown in FIG. 6, the signal reading device 200 is mainly configured from the coil 202, a differential receiver 212, an amplifier 214, a decoder 216, an S/P conversion portion 218, an interface 220, a clock regeneration portion 222, a PLL portion 224, and a timing control portion 226.

As described above, the serial signal is transmitted from the mobile terminal 190 to the signal reading device 200 using electromagnetic coupling. The serial signal is received by the differential receiver 212 using the coil 202. The differential receiver 212 inputs the received serial signal to the amplifier 214. The amplifier 214 is provided in order to amplify the signal level of the serial signal, the level having been lowered by the signal transmission by electromagnetic coupling. The serial signal that has been amplified by the amplifier 214 is input to the decoder 216 and the clock regeneration portion 222.

The decoder 216 detects the beginning portion of the data by referring to the header in the input serial signal, decodes the serial signal that was encoded by the Manchester encoding method, and inputs the signal to the S/P conversion portion 218. The S/P conversion portion 218 converts the input serial signal into the parallel signal (P-DATA). The parallel signal that has been converted by the S/P conversion portion 218 is output to the interface 220.

For its part, the clock regeneration portion 222 uses the built-in PLL portion 224 to regenerate the parallel signal clock from the serial signal clock by referring to a reference clock that is input from the outside. The parallel signal clock that has been regenerated by the clock regeneration portion 222 is input to the decoder 216 and to the timing control portion 226. The timing control portion 226 controls the receiving timing based on the parallel signal clock that is input from the clock regeneration portion 222. The parallel signal clock (P-CLK) that is input to the timing control portion 226 is output to the interface 220.

The interface 220 converts the parallel signal and the parallel signal clock that are input into a signal configuration that is compatible with the external output device. For example, the interface 220 may convert the input parallel signal into an analog RGB signal and a Digital Visual Interface (DVI) signal and output it to the car navigation system 10, the television receiver 20, and the like.

The functional configurations of the mobile terminal 190 and the signal reading device 200 have been explained above. The functions that are described above make it easy for the user to output video and the like to an external output device simply by setting the mobile terminal 190 in place on top of the signal reading device 200. It is therefore possible to output video and the like from the mobile terminal 190 to a large screen. Accordingly, the mobile terminal 190, in addition to its use as a simple communication device for an individual, can also be made to function as a TV telephone that is used by a large number of people.

USE EXAMPLE 2

Data Transmission Method that uses a Power Supply Line

The mobile terminal 190 that is described above uses as the encoding method the Manchester encoding method, which does not contain a direct current component. The encoded signal that does not contain a direct current component can be transmitted by superposing it on the power supply. Accordingly, a technology will be explained that utilizes a power supply line for the mobile terminal 190 that is described above. A mobile terminal 230 is an example of a configuration that uses this technology.

Functional Configuration

Figure 7A:
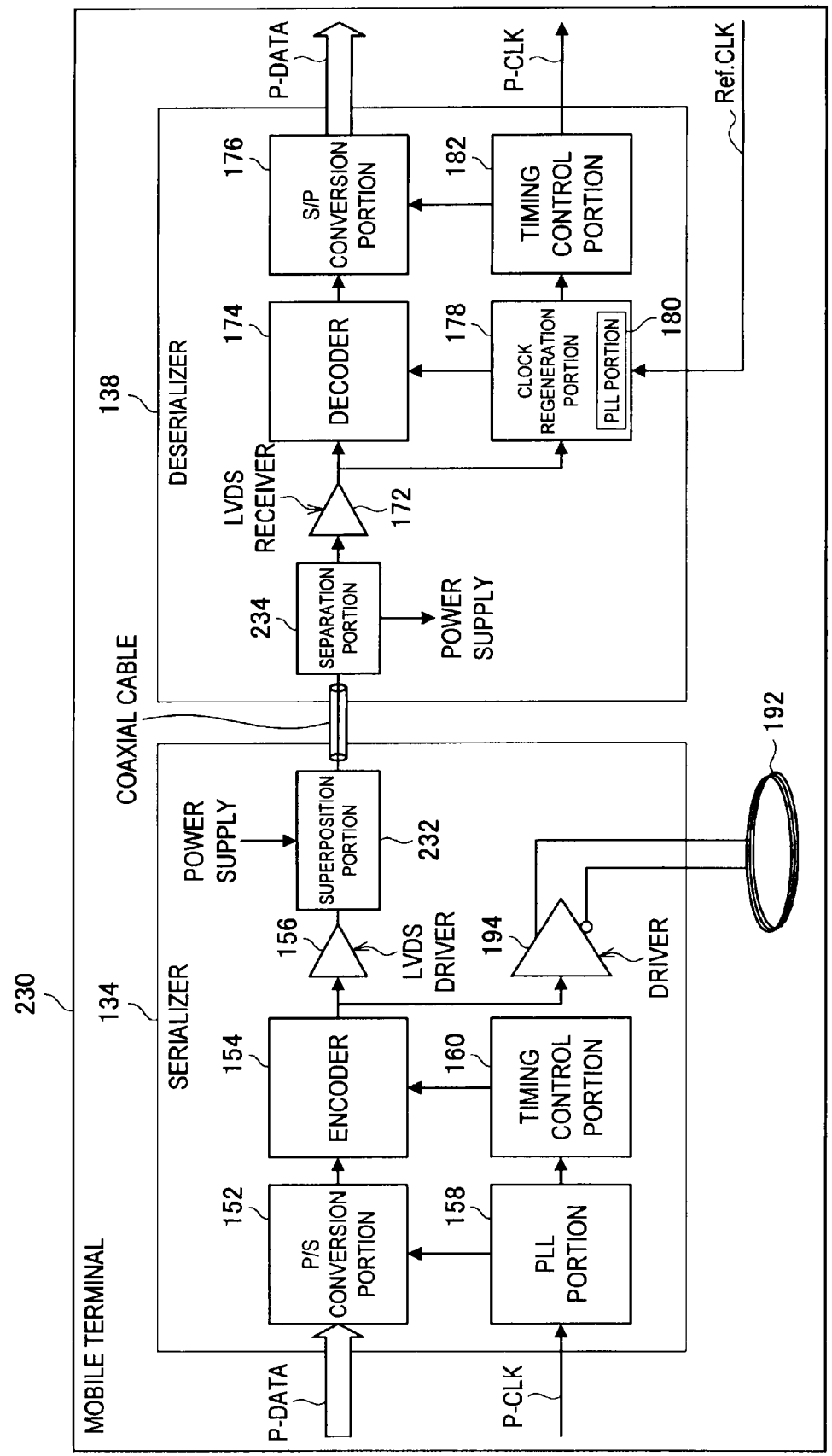
FIG. 7A is an explanatory figure that shows an example of a functional configuration of a mobile terminal that uses serial transmission.

Next, a functional configuration of the mobile terminal 230 that is capable of using the power supply line to transmit data will be explained with reference to FIG. 7A. FIG. 7A is an explanatory figure that shows an example of the functional configuration of the mobile terminal 230 that is capable of using the power supply line to transmit data. However, FIG. 7A is an explanatory figure that mainly illustrates the functional configurations of the serializer 134 and the deserializer 138, so descriptions of the other configuring elements will be omitted. Note also that configuring elements of the mobile terminal 230 that have substantially the same function as in the mobile terminal 190 that has already been described are denoted by the same reference numerals and detailed explanations will be omitted.

Serializer 134

As shown in FIG. 7A, the serializer 134 is configured from the P/S conversion portion 152, the encoder 154, the LVDS driver 156, the PLL portion 158, the timing control portion 160, the driver 194, and a superposition portion 232.

As shown in FIG. 7A, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154. The encoder 154 appends a header and the like to the serial signal, encodes the serial signal by a method with no (or little) direct current component, such as the Manchester encoding method or the like, and inputs the signal to the LVDS driver 156 and the driver 194.

The LVDS driver 156 turns the input serial signal into LVDS and inputs it to the superposition portion 232. The superposition portion 232 takes the signal that has been input from the LVDS driver 156 and transmits it to the deserializer 138 by superposing it on the power supply line. For example, the superposition portion 232 may couple the signal and the power supply using a capacitor for the signal and a choke coil for the power supply. Note that a coaxial cable, for example, may be used as the transmission path for the power supply line. Note also that the power supply line is a path that is provided in order to supply electric power from the operation portion 108 to the display portion 102. For its part, the driver 194, using electromagnetic coupling by the coil 192, transmits the input serial signal to the signal reading device 200.

Incidentally, the parallel signal clock that is input to the serializer 134 is input to the PLL portion 158. The PLL portion 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 7A, the deserializer 138 is mainly configured from the receiver 172, the decoder 174, the S/P conversion portion 176, the clock regeneration portion 178, the PLL portion 180, the timing control portion 182, and a separation portion 234.

As shown in FIG. 7A, the signal in which the serial signal is superposed on the power supply is transmitted to the deserializer 138 through the power supply line (the coaxial cable).

Figure 7B:
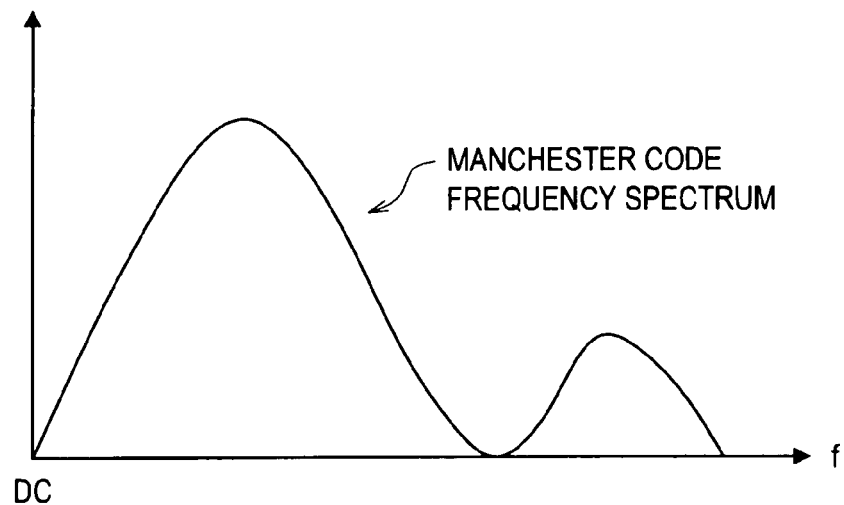
FIG. 7B is an explanatory figure that shows an example of a frequency spectrum for a Manchester code.

The frequency spectrum of the superposed signal is like that in FIG. 7B. As shown in FIG. 7B, the frequency spectrum of the Manchester code does not have a direct current component, so the signal can be transmitted together with the (DC) power supply.

Refer once again to FIG. 7A. The superposed signal that is described above is separated into the serial signal and the power supply by the separation portion 234. For example, the separation portion 234 may extract the serial signal by using a capacitor to cut the direct current component and may extract the power supply by using a choke coil to cut the high-frequency component. The serial signal that has been separated by the separation portion 234 is received by the receiver 172.

The serial signal that is received by the receiver 172 is input to the decoder 174 and to the clock regeneration portion 178. The decoder 174 detects the beginning portion of the data by referring to the header in the input serial signal, decodes the serial signal that was encoded by the Manchester encoding method, and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL portion 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the mobile terminal 230 that is described above can transmit the power supply and the serial signal (a video signal or the like) through a single coaxial cable. The operation portion 108 and the display portion 102 are therefore connected by only one cable, making it possible to increase the movability of the display portion 102 and to transform the mobile terminal 230 into a complicated shape. This broadens the range of uses for the mobile terminal 230 and also improves convenience for the user.

Summary of Issues 1

As explained above, a parallel transmission method like that of the mobile terminal 100 that is described above is not well suited to freely changing the positional relationship of the operation portion 108 and the display portion 102. Accordingly, providing the serializer 134 and the deserializer 138, as in the mobile terminal 130 that is described above, makes serial transmission of a video signal and the like possible and increases the range of movement of the display portion 102. Furthermore, the problem of the small size of the text characters, video images, and the like that are displayed on the LCD 104 has been solved by using electromagnetic coupling, as in the mobile terminal 190, to enable output to a large external screen. In addition, the movability of the display portion 102 has been increased by using a method that superposes the signal on the power supply line for transmission, taking advantage of the characteristics of the encoding method that is used by the mobile terminal 190.

However, as shown in FIGS. 3, 5, 6, and 7A, in the mobile terminals 130, 190 and 230, and in the signal reading device 200, the PLL portions 180 and 224 (hereinafter referred to as the PLLs) are used in order to regenerate the clock from the received serial signal. The PLLs are necessary in order to extract the clock from the signal that has been encoded by the Manchester encoding method. However, because the amount of electric power that is consumed by the PLLs themselves is not small, providing the PLLs increases the electric power that is consumed by the mobile terminals 130, 190, and 230, and by the signal reading device 200, to that extent. This increase in the amount of electric power that is consumed is an extremely serious problem for a small device such as a mobile telephone or the like.

Against the backdrop of this problem, demand has grown for a technology that will allow the deserializer 138 and the signal reading device 200 to be configured without providing them with the PLLs. Accordingly, a new signal transmission method has been proposed that addresses these technical issues and transmits a signal using a code that does not contain a direct current component and also does not require a PLL circuit when the clock is regenerated. In the explanation that follows, this signal transmission method is simply called the new method in some cases.

Basic Technology: New Method

The new signal transmission method (the new method) that transmits a signal using a code that does not contain a direct current component and does not require a PLL circuit when the clock is regenerated will be explained below. First the basic Alternate Mark Inversion (AMI) code will be briefly explained before the encoding method of the new method is explained. Then a functional configuration of a mobile terminal 300 according to the new method and the encoding method will be explained.

Signal Waveform of the AMI Code

Figure 8:
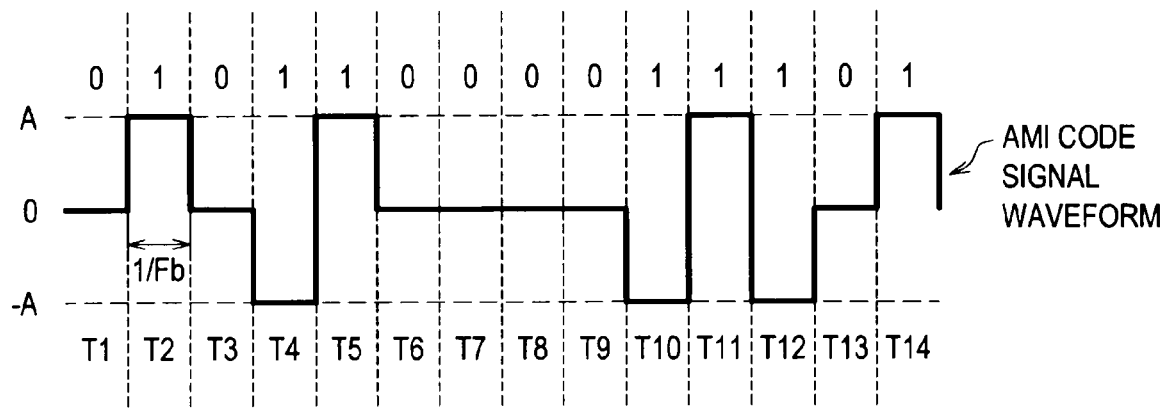
FIG. 8 is an explanatory figure that shows an example of a signal waveform of an AMI code.

First, the signal waveform and the characteristics of the AMI code will be briefly explained with reference to FIG. 8. FIG. 8 is an explanatory figure that shows an example of the signal waveform of the AMI code. However, in the explanation that follows, A will be treated as any positive number.

The AMI code is a code that uses an electrical potential of zero to express a data value of zero and potentials of A and −A to express a data value of 1. Note, however, that the potential A and the potential −A are used alternately. That is, after a data value of 1 has been expressed by the potential A, if the next data bit is also a 1, that 1 will be expressed by the potential −A. Because the data values are expressed by repeatedly inverting the polarity in this manner, the AMI code does not contain a direct current component. Note that other codes with the same type of characteristics as the AMI code include, for example, the partial response code that expresses the data as PR (1, −1), PR (1, 0, −1), PR (1, 0, . . . , −1), and the like. Signal codes that use this sort of polarity inversion are called bipolar codes. A dicode method or the like can also be used. An AMI code with a 100% duty factor will be used as an example in explaining the new method.

FIG. 8 schematically illustrates an AMI code with bit intervals T1 to T14. In FIG. 8, a data value of 1 is expressed at bit intervals T2, T4, T5, T10, T11, T12, and T14. Because the potential is A at bit interval T2, the potential at bit interval T4 is −A. Then at bit interval T5, the potential is A. Thus the amplitude that corresponds to a data value of 1 is alternately inverted between positive and negative values. This is the polarity inversion that is described above.

In contrast, a data value of zero is always expressed by a potential of zero. This form of expression prevents the AMI code from containing a direct current component, but it sometimes results in consecutive potentials of zero, as seen in bit intervals T6 to T9 in FIG. 8. The consecutive potentials of zero make it difficult to extract the clock from the signal waveform without using a PLL. Accordingly, the new method uses a technology that includes a clock component in the AMI code (or in a code that has equivalent characteristics) before transmitting the signal.

Functional Configuration

Figure 9:
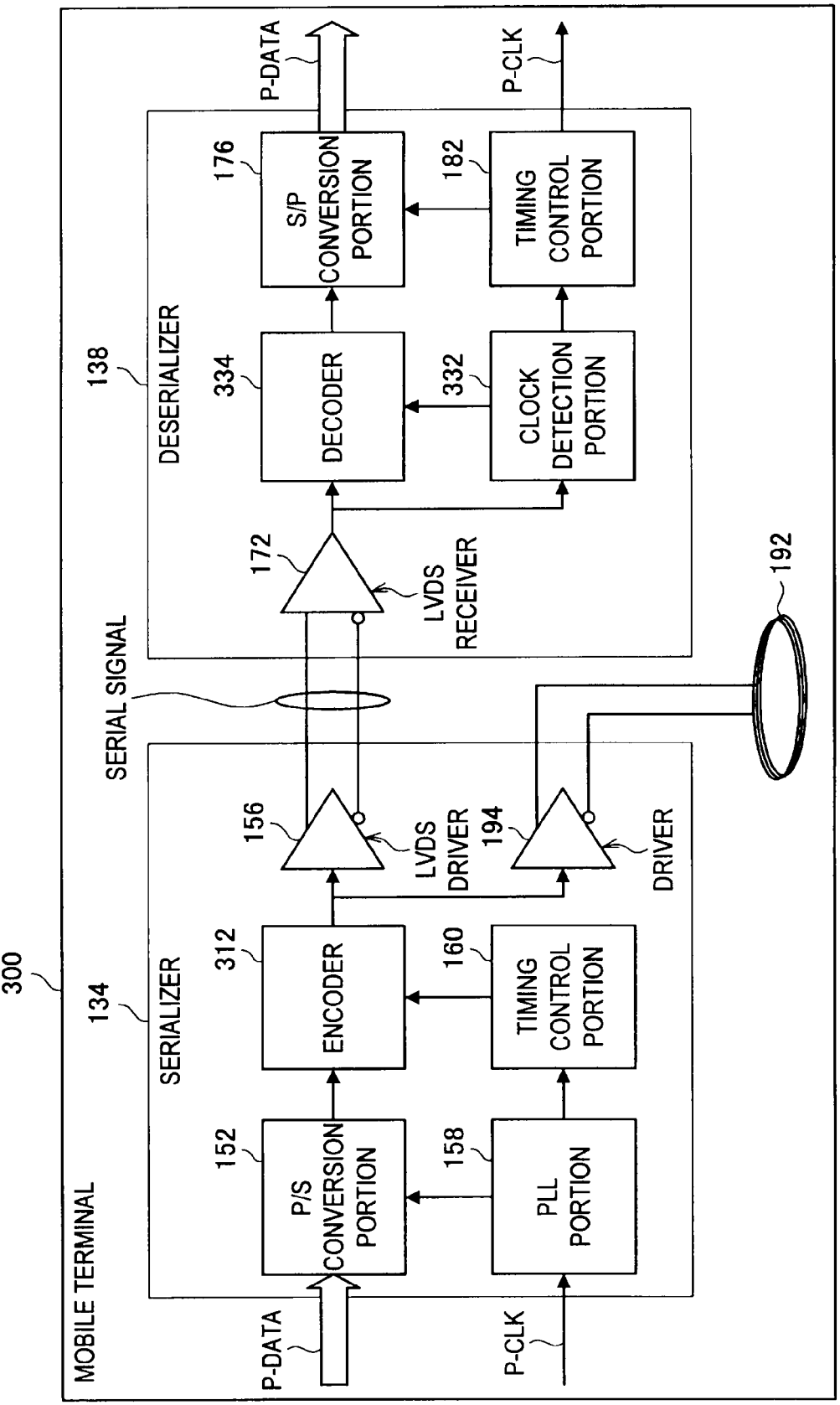
FIG. 9 is an explanatory figure that shows an example of a functional configuration of a mobile terminal that uses a new method.

Next, a functional configuration of the mobile terminal 300 according to the new method will be explained with reference to FIG. 9. FIG. 9 is an explanatory figure that shows an example of the functional configuration of the mobile terminal 300 according to the new method. However, FIG. 9 is an explanatory figure that mainly illustrates the functional configurations of the serializer 134 and the deserializer 138, so descriptions of the other configuring elements will be omitted. Note also that configuring elements of the mobile terminal 300 that have substantially the same function as in the mobile terminal 190 that has already been described are denoted by the same reference numerals and detailed explanations will be omitted.

Serializer 134

As shown in FIG. 9, the serializer 134 is configured from the P/S conversion portion 152, the LVDS driver 156, the PLL portion 158, the timing control portion 160, the driver 194, and an encoder 312. The main point of difference from the mobile terminal 190 that was described earlier is in the function of the encoder 312.

As shown in FIG. 9, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 312. The encoder 312 appends a header and the like to the serial signal and encodes the serial signal by a specified encoding method.

Figure 10:
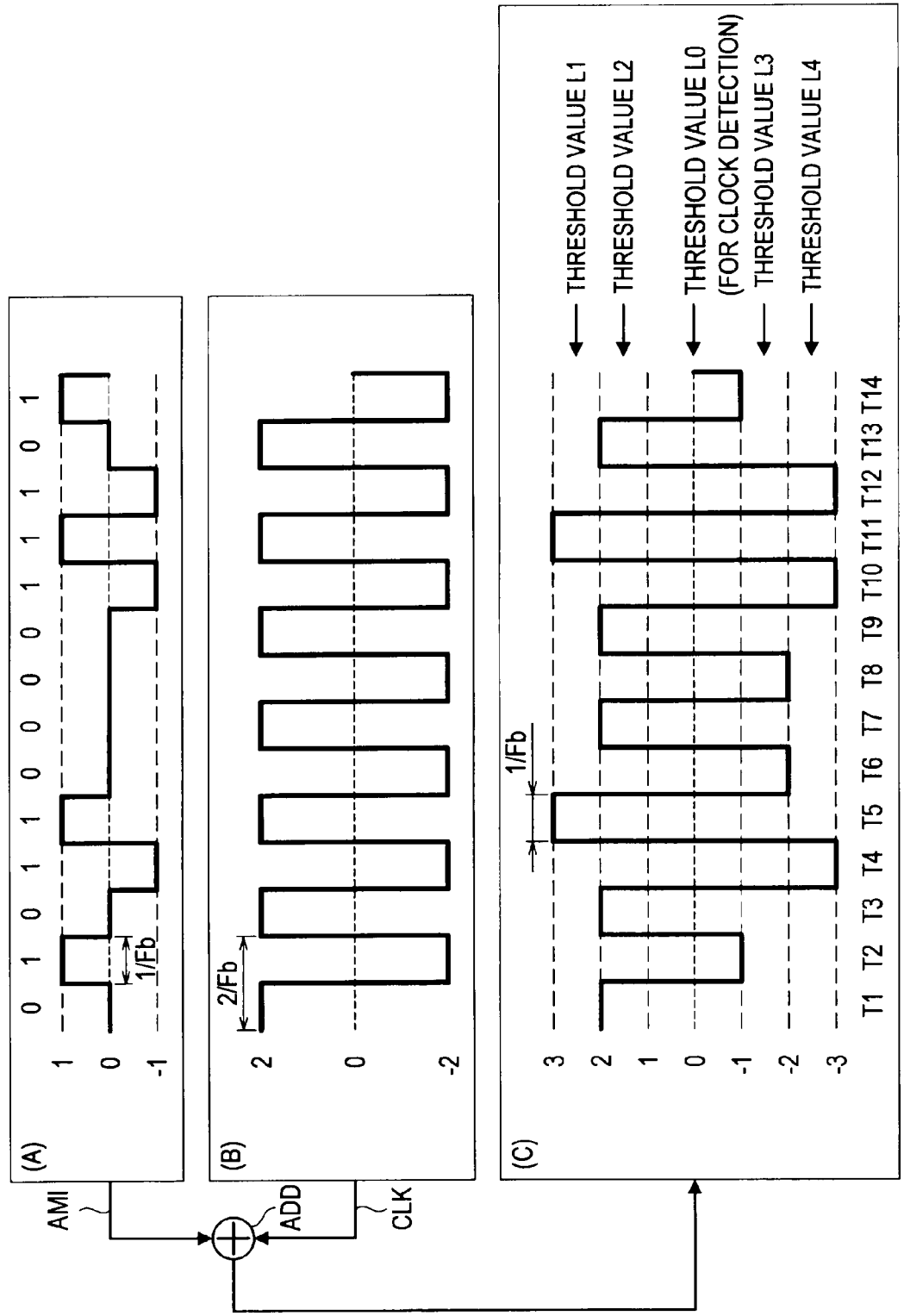
FIG. 10 is an explanatory figure that shows a signal generation method according to the new method.
Figure 11:
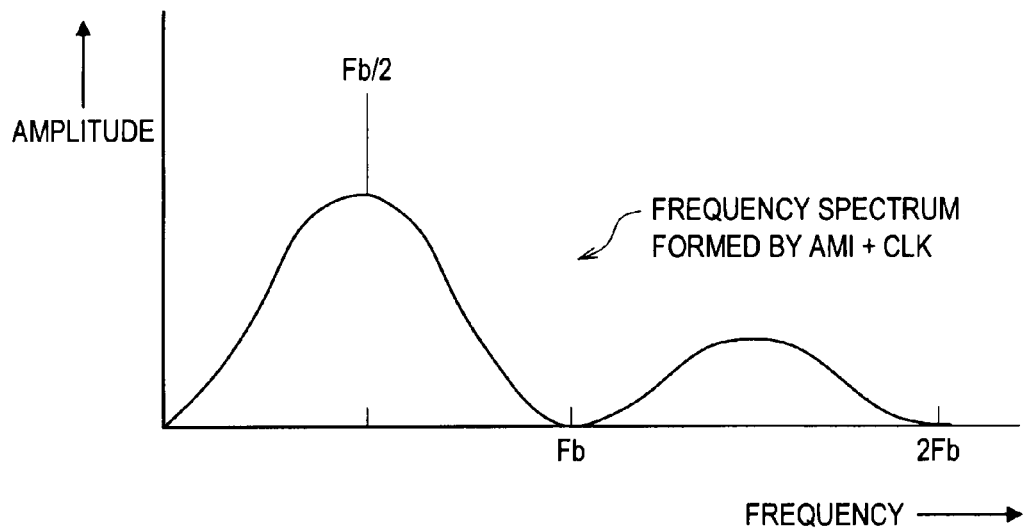
FIG. 11 is an explanatory figure that shows an example of a frequency spectrum for a signal according to the new method.

Next, a method for generating the encoded signal in the encoder 312 will be explained with reference to FIG. 10. FIG. 10 is an explanatory figure that shows an example of the encoding method according to the new method. Note that FIG. 10 illustrates a method of generating a code for which the AMI code serves as a base. However, the new method is not limited to using the AMI code as a base, and any code that has the same characteristics as the AMI code may also be used in the same manner. For example, a bipolar code, a code according to a partial response method, and the like can also be used.

The signal that is shown in (C) in FIG. 10 is a signal that has been encoded by the encoding method of the new method. In the signal, data values of 1 are expressed by a plurality of potentials A1 (−1, −3, 1, 3), and data values of zero are expressed by a plurality of potentials A2 (−2, 2) that are different from the potentials A1. Note that the signal is configured such that the polarities are inverted and is also configured such that the same potential does not occur consecutively. For example, referring to the portion where the zero data values occur consecutively in the bit intervals T6 to T9, the potentials are −2, 2, −2, and 2. Using this sort of code makes it possible for the clock component to be regenerated by detecting both the rising and the falling edges, even if the same data value occurs consecutively.

Because the encoder 312 generates a code like that described above, an adder ADD is provided. As shown in FIG. 10, the encoder 312 may take the serial signal that is input, encode it into the AMI code (A), for example, and input it to the adder ADD. The encoder 312 also generates a clock (B) that has a frequency (2/Fb) that is half of the transmission speed Fb of the AMI code and then inputs the clock to the adder ADD. Note that the clock amplitude is N times that of the AMI code (N>1; N=2 in the example in FIG. 10). The encoder 312 then generates the signal (C) by using the adder ADD to add the AMI code and the clock. At this time, the AMI code and the clock are synchronized, and their edges are aligned when they are added.

Refer once again to FIG. 9. The serial signal that has been encoded by the encoder 312 is input to the LVDS driver 156 and the driver 194. The LVDS driver 156 transmits the input serial signal to the deserializer 138 by a differential transmission method according to LVDS. For its part, the driver 194, using electromagnetic coupling by the coil 192, transmits the input serial signal to the signal reading device 200. Note that the configuring elements for transmitting the signal to the signal reading device 200 may be omitted as necessary according to the embodiment.

In contrast, the parallel signal clock that is input to the serializer 134 is input to the PLL portion 158. The PLL portion 158 generates a serial signal clock from the parallel signal clock and inputs it to the P/S conversion portion 152 and to the timing control portion 160. The timing control portion 160 controls the timing of the transmission of the serial signal by the encoder 312, based on the serial signal clock that is input.

Deserializer 138

As shown in FIG. 9, the deserializer 138 is mainly configured from the receiver 172, the S/P conversion portion 176, the timing control portion 182, a clock detection portion 332, and a decoder 334. The main point of difference from the mobile terminal 190 that was described earlier is in the clock detection portion 332, which does not have a PLL.

As shown in FIG. 9, the serial signal is transmitted to the deserializer 138 from the serializer 134 by the differential transmission method according to LVDS. The serial signal is received by the receiver 172. The serial signal that is received by the receiver 172 is input to the decoder 334 and to the clock detection portion 332. The decoder 334 detects the beginning portion of the data by referring to the header in the input serial signal and decodes the serial signal that was encoded by the encoding method that is used by the encoder 312.

Next, the method of decoding by the decoder 334 will be explained with reference to FIG. 10. As explained above, the serial signal is encoded by the encoder 312 into the form that is shown in (C) in FIG. 10. Accordingly, the decoder 334 can decode the original serial signal by determining whether the amplitude of the signal is A1 or A2.

Four threshold values (L1, L2, L3, L4) that are shown in (C) in FIG. 10 are used to determine whether the amplitude is A1 (−1, −3, 1, 3), which corresponds to a data value of 1, or A2 (−2, 2), which corresponds to a data value zero. Accordingly, the decoder 334 compares the amplitude of the input serial signal to the four threshold values described above and determines whether the amplitude is A1 or A2, then decodes the original serial signal. The decoding processing will be described in detail at a later stage (refer to FIGS. 12 to 15).

Refer once again to FIG. 9. The serial signal that has been decoded by the decoder 334 is input to the S/P conversion portion 176. The S/P conversion portion 176 converts the input serial signal into the parallel signal (P-DATA). The parallel signal that has been converted by the S/P conversion portion 176 is output to the LCD 104.

For its part, the clock detection portion 332 detects the clock component in the input serial signal. As has already been explained, using the code that is shown in (C) in FIG. 10 makes it possible for the clock component to be detected based on the cycle of the polarity inversion, the polarity of the amplitude being determined by comparing the amplitude to a threshold value L0 (a potential of zero). Therefore, the clock detection portion 332 can detect the clock component of the signal without using a PLL. This makes it possible to reduce the amount of electric power that is consumed by the deserializer 138.

Refer once again to FIG. 9. The clock that is detected by the clock detection portion 332 is input to the decoder 334 and the timing control portion 182. The timing control portion 182 controls the receiving timing based on the clock that is input from the clock detection portion 332. The clock (P-CLK) that is input to the timing control portion 182 is output to the LCD 104.

Thus, using a code that does not contain a direct current component (refer to FIG. 11) and from which the clock component can be regenerated based on the polarity inversion cycle makes it possible to perform the clock detection without using a PLL, greatly reducing the amount of electric power that the mobile terminal consumes. Note that the frequency spectrum for the code that is used by the new method may take a form like that shown in FIG. 11, for example. A line spectrum is evident in the clock frequency Fb/2 that is added by the adder ADD of the encoder 312, in addition to which the broad frequency spectrum of the AMI code is also present. Note that in this frequency spectrum, null points exist at the frequencies Fb, 2Fb, 3Fb, and the like.

The technology according to the new method can also be applied to configurations like those in the mobile terminals 130, 190, and 230 and the signal reading device 200 that are described above. In other words, the technology can also be applied to an electronic device that uses a method of transmitting signals by one of the electric power line transmission method and electromagnetic coupling. If the new method were to be applied to these sorts of electronic devices, the PLL could be omitted from the deserializer 138 that is mounted in each of the devices.

Details of Decoding Processing

Figure 12:
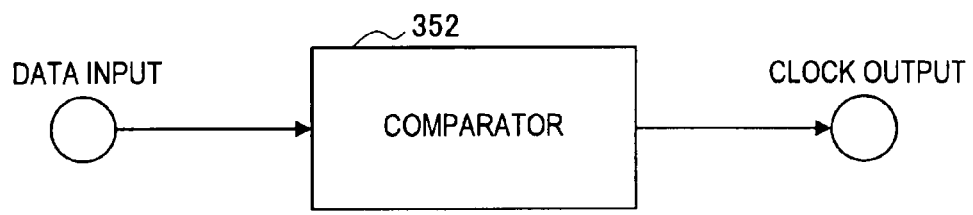
FIG. 12 is an explanatory figure that shows an example of a circuit configuration of a clock detection portion.
Figure 13:
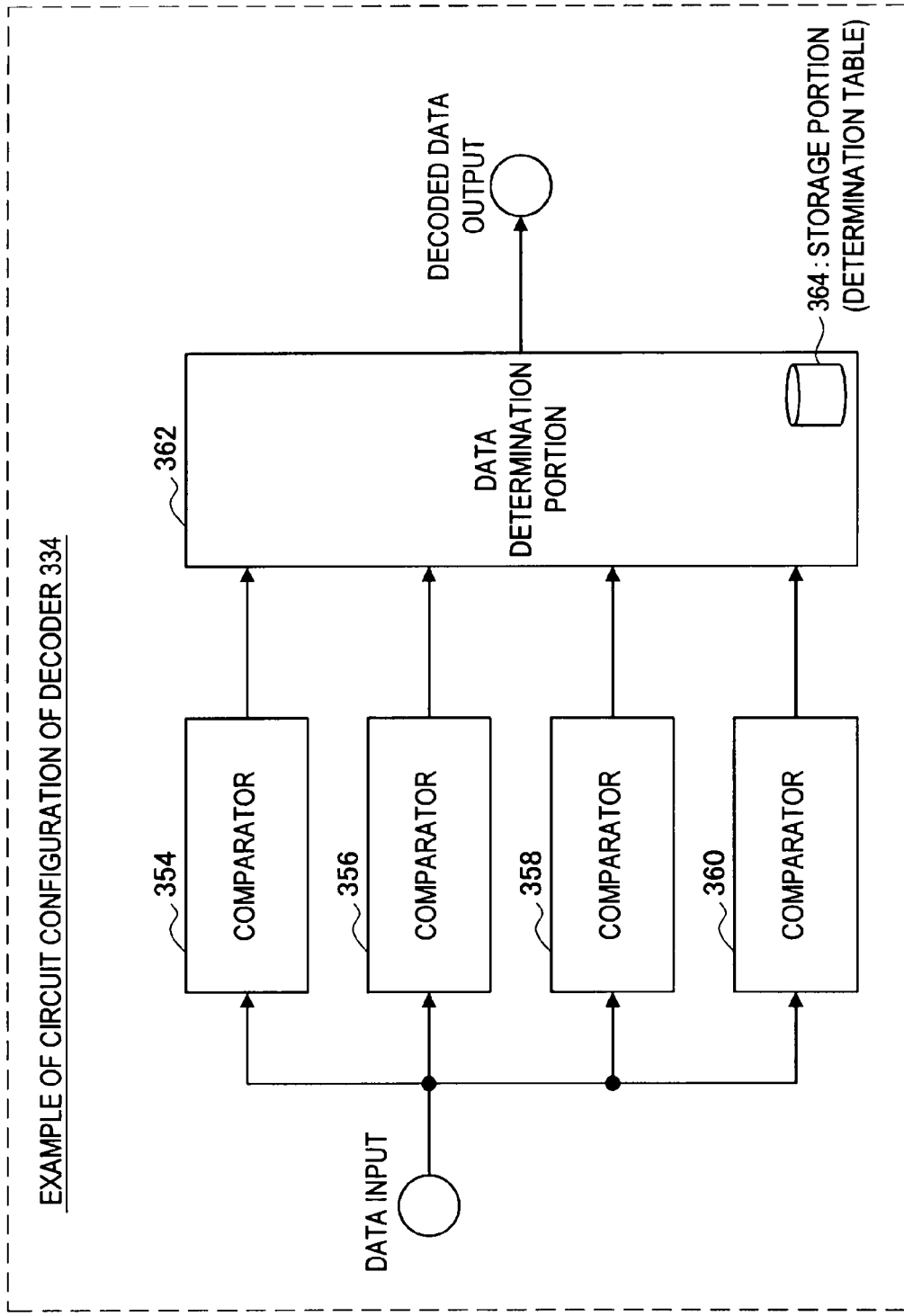
FIG. 13 is an explanatory figure that shows an example of a circuit configuration of a decoder.
Figure 15:
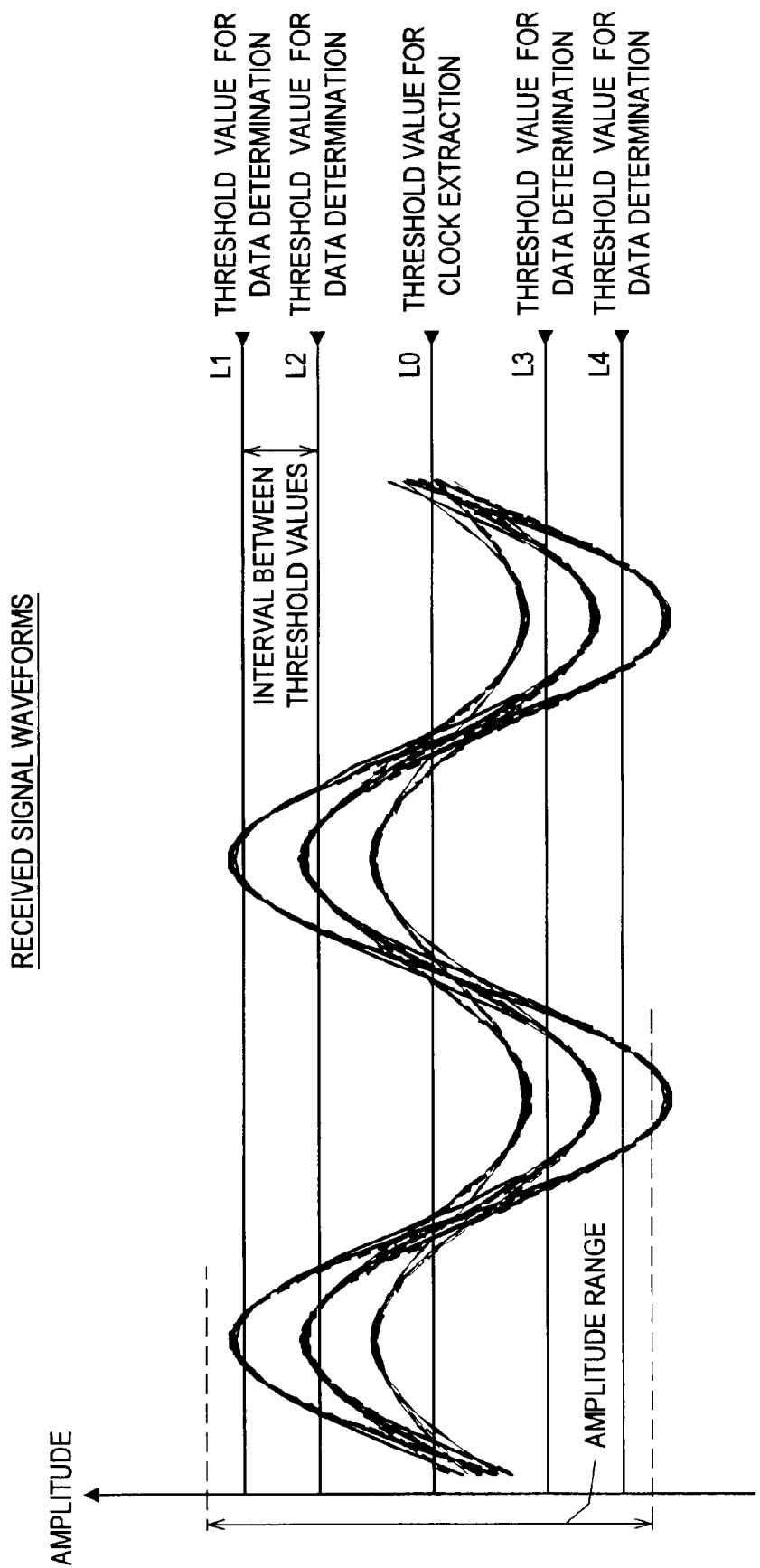
FIG. 15 is an explanatory figure that shows relationships between received signal waveforms and threshold values for data determination.

Next, the details of the decoding processing in the new method will be explained with reference to FIGS. 12 to 15. FIG. 12 is an explanatory figure that shows an example of a circuit configuration of the clock detection portion 332. FIG. 13 is an explanatory figure that shows an example of a circuit configuration of the decoder 334. FIG. 14 is an explanatory figure that shows an example of a configuration of a determination table for data determination. FIG. 15 is an explanatory figure that shows received signal waveforms (an eye pattern is shown in the drawing) in a case where the new method is used.

Example of Circuit Configuration of the Clock Detection Portion 332

First, refer to FIG. 12. As shown in FIG. 12, the function of the clock detection portion 332 is implemented in a comparator 352.

The amplitude values of the signal that has been encoded by the new method are input as input data to the comparator 352. Once the input data have been input, the comparator 352 compares the input amplitude values to a specified threshold value. For example, the comparator 352 may determine whether or not the input amplitude values are greater than the specified threshold value. The comparator 352 is provided to extract the clock based on the code of the new method (refer to (C) in FIG. 10). Therefore, the threshold value L0 is used as the specified threshold value.

For example, in a case where the input amplitude value is greater than the specified threshold value, the comparator 352 may output a determination value (for example, 1) that indicates that the input amplitude value is greater than the specified threshold value. On the other hand, in a case where the input amplitude value is not grater than the specified threshold value, the comparator 352 may output a determination value (for example, zero) that indicates that the input amplitude value is not greater than the specified threshold value. The results that are output by the comparator 352 are input as the clock to the decoder 334 and the timing control portion 182.

Example of Circuit Configuration of the Decoder 334

Next, refer to FIG. 13. As shown in FIG. 13, the function of the decoder 334 is implemented in a plurality of comparators 354, 356, 358, 360 and in a data determination portion 362. Further, a storage portion 364 is provided in the data determination portion 362. The determination table for data determination that is shown in FIG. 14 is stored in the storage portion 364.

A different threshold value is set for each of the plurality of comparators 354, 356, 358, 360. For example, the threshold value L1 may be set for the comparator 354, the threshold value L2 may be set for the comparator 356, the threshold value L3 may be set for the comparator 358, and the threshold value L4 may be set for the comparator 360. However, as shown in (C) in FIG. 10, the relationships among the threshold values L1, L2, L3 and L4 must satisfy the condition L1>L2>L3>L4.

First, the amplitude values of the signal that has been encoded by the new method are input as input data to the plurality of comparators 354, 356, 358, 360. At this time, the same input data are input in parallel to the plurality of comparators 354, 356, 358, 360.

Once the input data have been input, the comparator 354 compares the input amplitude values to the threshold value L1 and determines whether or not the input amplitude values are greater than the threshold value L1. In a case where the input amplitude value is greater than the threshold value L1, the comparator 354 outputs a determination value (for example, 1) that indicates that the input amplitude value is greater than the threshold value L1. On the other hand, in a case where the input amplitude value is not greater than the threshold value L1, the comparator 354 outputs a determination value (for example, zero) that indicates that the input amplitude value is not greater than the threshold value L1.

In the same manner, the comparator 356 compares the input amplitude values to the threshold value L2 and determines whether or not the input amplitude values are greater than the threshold value L2. The comparator 358 compares the input amplitude values to the threshold value L3 and determines whether or not the input amplitude values are greater than the threshold value L3. The comparator 360 compares the input amplitude values to the threshold value L4 and determines whether or not the input amplitude values are greater than the threshold value L4. The determination results that are output from the plurality of comparators 354, 356, 358, 360 are input to the data determination portion 362.

Based on the determination results that are output from the plurality of comparators 354, 356, 358, 360, the data determination portion 362 determines the bit values that are indicated by the input data. In this process, the data determination portion 362 refers to the determination table for data determination (refer to FIG. 14) that is stored in the storage portion 364 and based on the determination table, determines the bit values that are indicated by the input data.

The table that is shown in FIG. 14, for example, may be used as the determination table for data determination. As shown in the example in FIG. 14, in the determination table, a bit value (zero or 1) is associated with each combination of the values that are output from the plurality of comparators 354, 356, 358, 360.

Consider, for example, a case in which the output value from the comparator 354 is 1. In this case, the input amplitude value is greater than the threshold value L1. As explained above, the relationship among the threshold values is defined as L1>L2>L3>L4. Based on this relationship, the output values from the comparators 356, 358, 360 must also be 1. Referring to (C) in FIG. 10, the bit value that corresponds to the amplitude that has a value that is greater than the threshold value L1 is 1. Therefore, a bit value of 1 is associated with the combination in which all of the output values from the comparators 354, 356, 358, 360 are 1.

Consider other conditions as well. For the purposes of this discussion, the output values from the comparators 354, 356, 358, 360 are respectively called d1, d2, d3, d4, and the combination of the output values is expressed as (d1, d2, d3, d4). For example, if the combination (d1, d2, d3, d4) is (0, 1, 1, 1), it means that an input data value d satisfies the condition L1>d>L2. Referring to (C) in FIG. 10, in a case where the input data value d satisfies the condition L1>d>L2, the bit value is zero.

In the same manner, if the combination (d1, d2, d3, d4) is (0, 0, 1, 1), it means that the input data value d satisfies the condition L2>d>L3. Referring to (C) in FIG. 10, in a case where the input data value d satisfies the condition L2>d>L3, the bit value is 1. If the combination (d1, d2, d3, d4) is (0, 0, 0, 1), it means that the input data value d satisfies the condition L3>d>L4. Referring to (C) in FIG. 10, in a case where the input data value d satisfies the condition L3>d>L4, the bit value is zero. If the combination (d1, d2, d3, d4) is (0, 0, 0, 0), it means that the input data value d satisfies the condition L4>d. Referring to (C) in FIG. 10, in a case where the input data value d satisfies the condition L4>d, the bit value is 1.

Thus, the combinations of the output values that are output individually from the comparators 354, 356, 358, 360 can be associated with specific bit values, and the determination table that is shown in FIG. 14 is an example of the correspondence relationships between the combinations and the bit values, summarized in the form of a table. The data determination portion 362 refers to this sort of determination table and determines the bit values based on the combinations of the output values that are output from the plurality of comparators 354, 356, 358, 360. The bit values that are determined by the data determination portion 362 are input to the S/P conversion portion 176.

Summary of Issues 2

As described above, in order to decode the code of the new method shown in (C) in FIG. 10, the single comparator 352 that forms the clock detection portion 332, and the four comparators 354, 356, 358, 360 of the decoder 334 are required. As mentioned above, the code that is used in the new method provides specific advantages in that it does not contain a direct current component and makes it possible for the clock to be regenerated without using a PLL circuit. However, a total of five comparators are required to determine two bit values. As a result, the circuit scale is increased, and power consumption is also increased.

In addition, as many as five threshold values are provided in an amplitude direction to perform a data determination process. Therefore, if the maximum width (the amplitude range) of the signal amplitude is determined in advance, the intervals between the individual threshold values are narrowed as shown in FIG. 15. As a result, high accuracy is required for threshold value setting as well as bit value determination.

In recent years, miniaturization of semiconductor processes has been promoted, and the operating voltage lowered. Along with this, the signal amplitude range has been reduced. Further, in order to use a code that has a plurality of bit values in the amplitude direction, the maximum value and the minimum value of the signal amplitude need to be within the range of the aforementioned operating voltage. In this situation, if the data determination process is performed by providing as many as five threshold values in the amplitude direction, the threshold values need to be set with a very high setting accuracy, which is not realistic.

Addressing these technological issues, an embodiment that will be described below can be achieved using a reduced circuit scale and does not require such highly accurate threshold value setting accuracy, by reducing the number of the comparators (the number of the threshold values) that are used when decoding the code according to the new method. Of course, the embodiment that will be explained below also resolves the issues that were described earlier (in the Summary of issues 1). The embodiment that makes it possible to achieve these objectives will be explained below.

Embodiment

The embodiment of the present invention will be described. The present embodiment relates to a technology that decodes the code according to the new method described above. Especially, the present embodiment relates to a technology that reduces the number of the comparators that are used when a bit value is determined from the code of the new method.

Functional Configuration of Mobile Terminal 400

Figure 16:
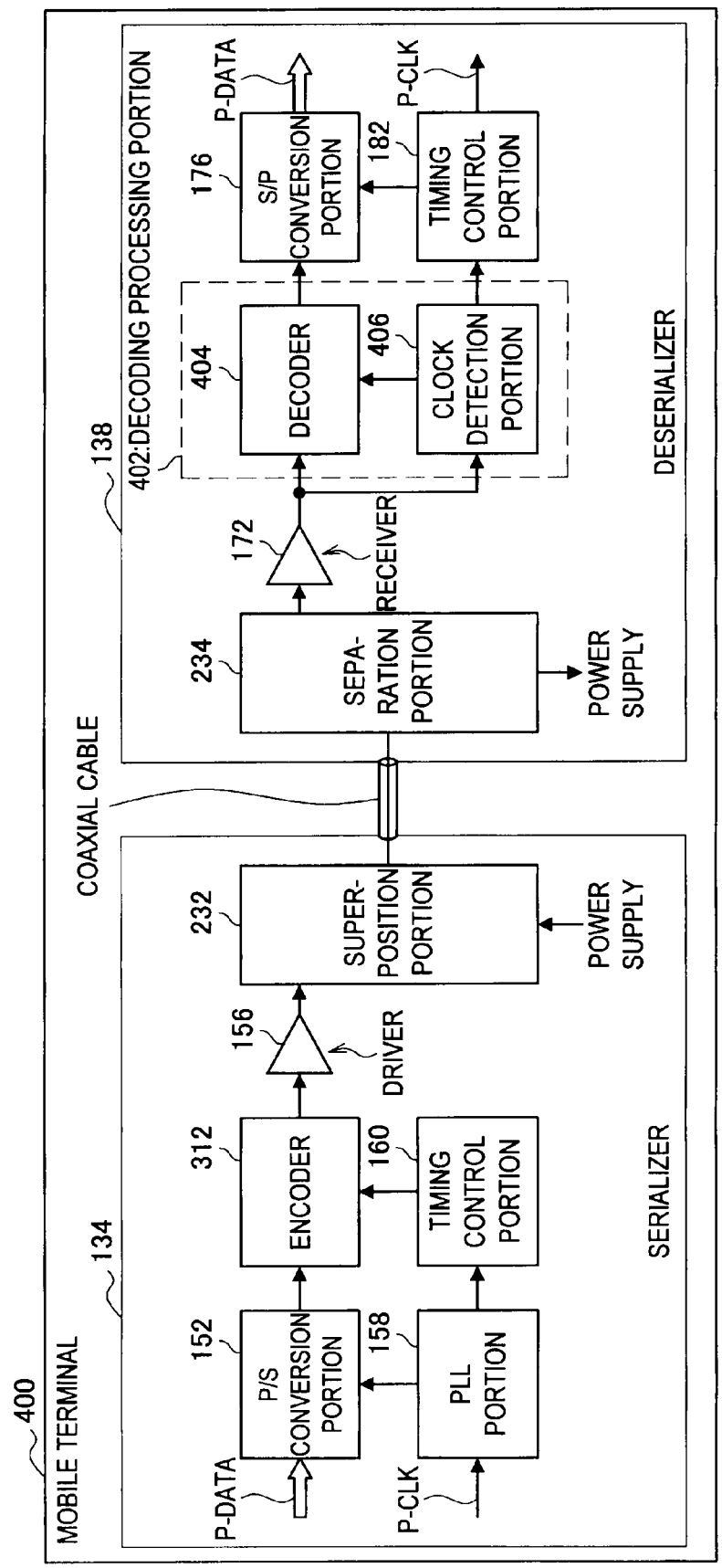
FIG. 16 is an explanatory figure that shows an example of a functional configuration of a mobile terminal according to an embodiment of the present invention.

First, a functional configuration of a mobile terminal 400 according to the present embodiment will be described with reference to FIG. 16. FIG. 16 is an explanatory figure that shows an example of the functional configuration of the mobile terminal 400 according to the present embodiment. FIG. 16 is the explanatory figure that mainly illustrates the functional configurations of the serializer 134 and the deserializer 138, so descriptions of the other configuring elements will be omitted. Note also that configuring elements of the mobile terminal 400 that have substantially the same function as in the mobile terminals 230 and 300 that have already been described are denoted by the same reference numerals and detailed explanations will be omitted.

Serializer 134

As shown in FIG. 16, the serializer 134 is configured from the P/S conversion portion 152, the encoder 312, the driver 156, the PLL portion 158, the timing control portion 160, and the superposition portion 232.

As shown in FIG. 16, the parallel signal (P-DATA) and the parallel signal clock (P-CLK) are input to the serializer 134 from the BBP 110. The parallel signal (P-DATA) that is input to the serializer 134 is converted to a serial signal by the P/S conversion portion 152. The serial signal that has been converted by the P/S conversion portion 152 is input to the encoder 312. The encoder 312 appends a header and the like to the serial signal, and encodes the serial signal using the encoding method of the new method. For example, when the serial signal is expressed by an AMI code method, the serial signal is encoded based on the encoding method shown in FIG. 10.

The signal encoded by the encoder 312 is input to the driver 156. The driver 156 inputs to the superposition portion 232 the input serial signal. The superposition portion 232 takes the signal that has been input from the driver 156 and transmits it to the deserializer 138 by superposing it on the power supply line. For example, the superposition portion 232 may couple the signal and the power supply using a capacitor for the signal and a choke coil for the power supply. Note that a coaxial cable, for example, may be used as the transmission path for the power supply line.

Note that, the parallel signal clock (P-CLK) that is input to the serializer 134 is input to the PLL portion 158. The PLL portion 158 generates a serial signal clock from the parallel signal clock (P-CLK) and inputs it to the P/S conversion portion 152 and to the timing control portion 160. The timing control portion 160 controls the timing of the transmission of the serial signal by the encoder 312, based on the serial signal clock that is input.

Deserializer 138

As shown in FIG. 16, the deserializer 138 is mainly configured from the receiver 172, a decoder 404, the S/P conversion portion 176, a clock detection portion 406, the timing control portion 182, and the separation portion 234. Note that the decoder 404 and the clock detection portion 406 form a decoding processing portion 402.

As shown in FIG. 16, the signal in which the serial signal is superposed on the power supply is transmitted to the deserializer 138 through the power supply line (the coaxial cable). The superposed signal is separated into the serial signal and the power supply by the separation portion 234. For example, the separation portion 234 may extract the serial signal by using a capacitor to cut the direct current component and may extract the power supply by using a choke coil to cut the high-frequency component. The serial signal that has been separated by the separation portion 234 is received by the receiver 172.

The serial signal received by the receiver 172 is input to the decoder 404 and the clock detection portion 406. The clock detection portion 406 detects the clock component in the input serial signal. The clock component is extracted by comparing the amplitude value of the input signal to the threshold value L0 (a potential of zero) and detecting the cycle of the polarity inversion of the amplitude. Therefore, the clock detection portion 406 can detect the clock component of the signal without using a PLL. The clock detected by the clock detection portion 406 is input to the decoder 404 and the timing control portion 182.

The decoder 404 detects the beginning portion of the data by referring to the header in the input serial signal, and decodes the data based on the encoding method of the encoder 312. At this time, the decoder 404 subtracts, from the serial signal, the clock signal input by the clock detection portion 406, and decodes the data based on the amplitude value of the serial signal after the subtraction. The decoding process performed by the decoder 404 will be described in detail at a later stage.

The data decoded by the decoder 404 is input to the S/P conversion portion 176. The S/P conversion portion 176 converts the input serial data to a parallel data (P-DATA). The parallel data converted by the S/P conversion portion 176 is output to the LCD 104. Note that the timing control portion 182 controls the receiving timing based on the clock input from the clock detection portion 406. Further, the clock (P-CLK) that is input to the timing control portion 182 is output to the LCD 104.

Thus, using a code that does not contain a direct current component (refer to FIG. 11) and from which the clock component can be regenerated based on the polarity inversion cycle makes it possible to perform the clock detection without using a PLL, greatly reducing the amount of electric power that the mobile terminal consumes. Further, as described above, the data is decoded based on the amplitude value of the serial signal obtained by the decoder 404 subtracting the clock signal. Thus, the number of threshold values used to determine each bit value of the data is reduced. This point will be described below in more detail.

Example of Circuit Configuration of Decoding Processing Portion 402

Figure 17:
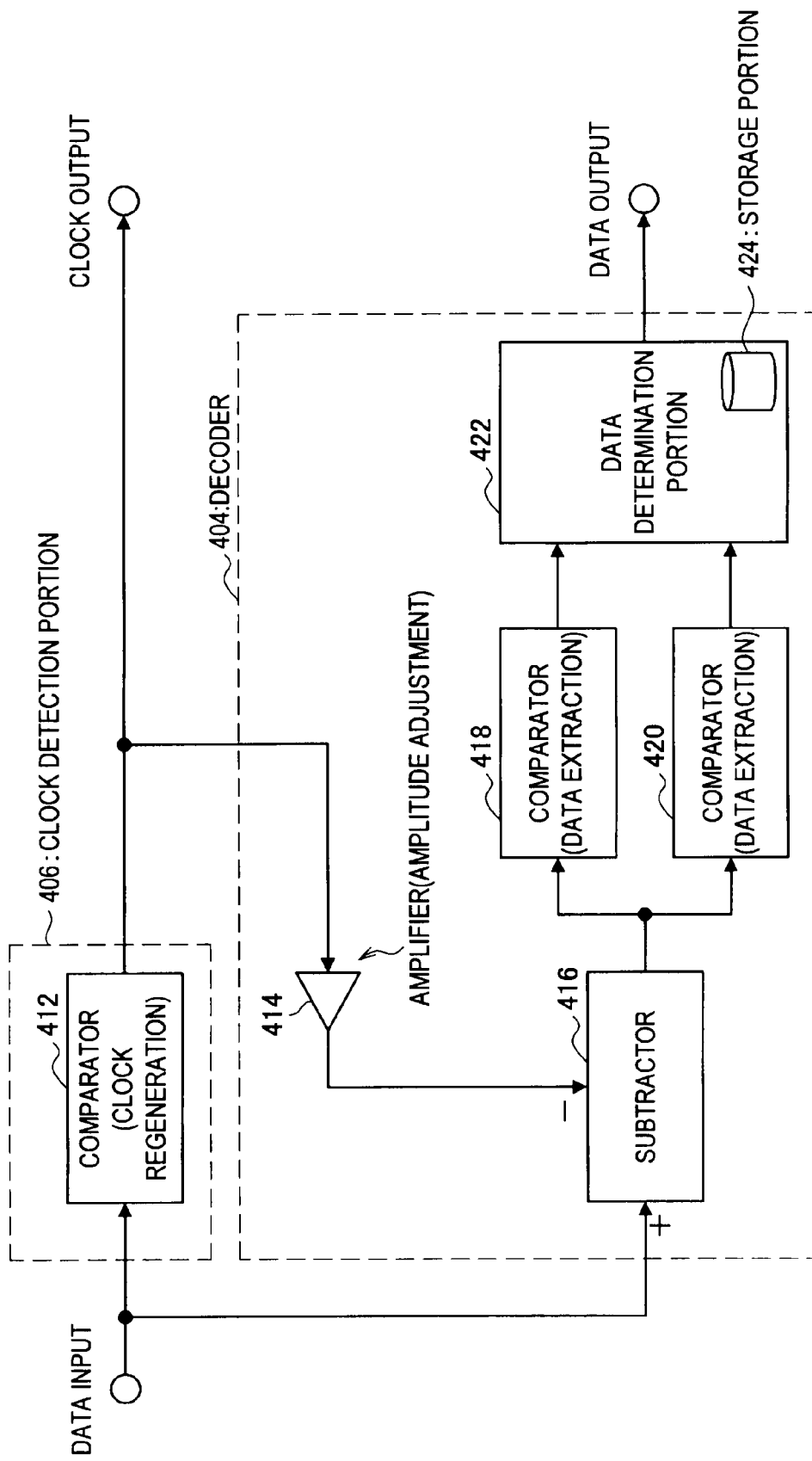
FIG. 17 is an explanatory figure that shows an example of a circuit configuration of a decoding processing portion according to the embodiment.

The circuit configuration of the decoding processing portion 402 of the deserializer 138 will be described with reference to FIG. 17. FIG. 17 is an explanatory figure that shows an example of the circuit configuration of the decoding processing portion 402.

As shown in FIG. 17, the decoding processing portion 402 includes a comparator 412 for clock regeneration, an amplifier 414, a subtractor 416, comparators 418 and 420 for data extraction, and a data determination portion 422.

Clock Detection Portion 406

First, the configuration of the clock detection portion 406 will be described. The function of the clock detection portion 406 is achieved by the comparator 412 for clock regeneration. The amplitude values of the signal that has been encoded by the new method are input as input data to the comparator 412. Once the input data have been input, the comparator 412 compares the input amplitude values to a specified threshold value. For example, the comparator 412 may determine whether or not the input amplitude values are greater than the specified threshold value. The comparator 412 is provided to extract the clock based on the code of the new method (refer to (C) in FIG. 10). Therefore, the threshold value L0 is used as the specified threshold value.

For example, in a case where the input amplitude value is greater than the specified threshold value, the comparator 412 may output a determination value (for example, 1) that indicates that the input amplitude value is greater than the specified threshold value. On the other hand, in a case where the input amplitude value is not grater than the specified threshold value, the comparator 412 may output a determination value (for example, zero) that indicates that the input amplitude value is not greater than the specified threshold value. The results that are output by the comparator 412 are input as the clock to the amplifier 414 and the timing control portion 182.

Decoder 404

Next, the configuration of the decoder 404 will be described. The function of the decoder 404 is achieved by the amplifier 414, the subtractor 416, the comparators 418 and 420 for data extraction, and the data determination portion 422. The data determination portion 422 is provided with a storage portion 424. The determination table for data determination shown in FIG. 18 is stored in the storage portion 424.

As described above, the clock is input to the amplifier 414 from the comparator 412 for clock regeneration. The amplifier 414 adjusts the input clock to have a predetermined amplitude, and outputs it. The clock output from the amplifier 414 is input to the subtractor 416. The input data that has been encoded by the new method is also input to the subtractor 416. Then, the subtractor 416 subtracts the clock component from the input data.

Figure 19:
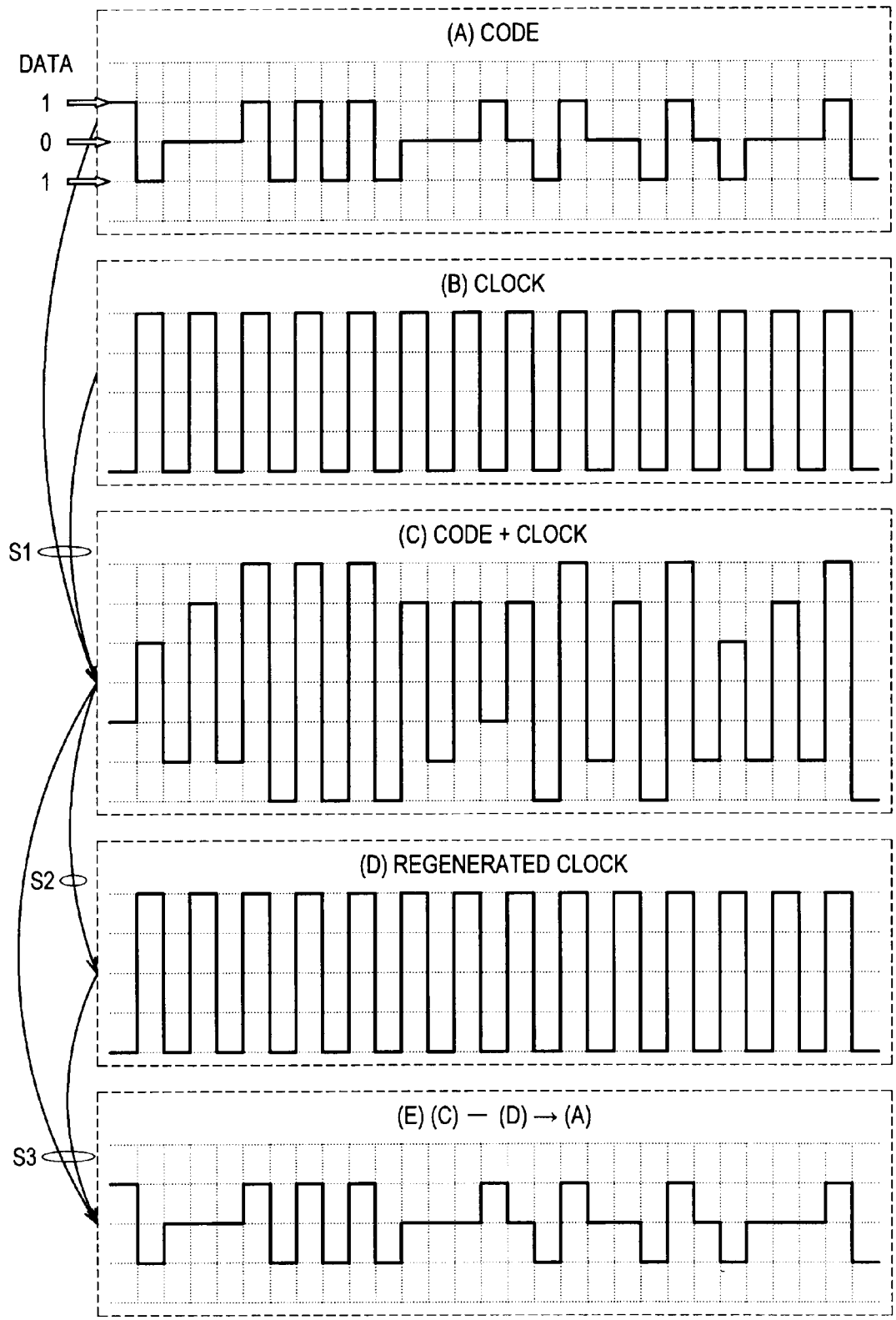
FIG. 19 is an explanatory figure that shows the flow of a signal processing method according to the embodiment.

The data output from the subtractor 416 is input in parallel to the plurality of comparators 418 and 420. For example, if the input data is the code shown in (C) in FIG. 10, the data obtained by the substractor 416 subtracting the clock component is expressed as the code (A) shown in FIG. 10. FIG. 19 shows this situation.

The code (C) shown in FIG. 19 is a code of the input data that is input to the subtractor 416. The code (C) is obtained by adding a clock (B) to a predetermined code (A) using the same method as the code (C) in FIG. 10 so that the code (C) does not contain a direct current component and the clock can be regenerated by detecting polarity inversion.

The subtractor 416 subtracts a regenerated clock (D) from the code (C) to reproduce the original code (A). However, there is some degree of difference between the regenerated clock (D) and the clock (B). Accordingly, the original code (A) is not accurately reproduced. However, the number of amplitude values can be reduced by half from 6 to 3, by subtracting the regenerated clock (D) from the coed (C). The reduction of the number of the amplitude values makes it possible to reduce the number of the threshold values used to determine a data bit value. For example, as shown in FIG. 19, in a case of a code (E) that has three amplitude values including an amplitude value of zero, the data bit value can be determined by two threshold values.

Referring once again to FIG. 17, as described above, the data having a reduced number of amplitude values is input to the two comparators 418 and 420. A different threshold value is set for each of the plurality of comparators 418 and 420. For example, the threshold value L1' may be set for the comparator 418, the threshold value L2' may be set for the comparator 420. However, the relationships among the threshold values L1' and L2' must satisfy the condition 1>L1'>0>L2'>−1.

Once the data have been input from the subtractor 416, the comparator 418 compares the input amplitude values to the threshold value L1' and determines whether or not the input amplitude values are greater than the threshold value L1'. In a case where the input amplitude value is greater than the threshold value L1', the comparator 418 outputs a determination value (for example, 1) that indicates that the input amplitude value is greater than the threshold value L1'. On the other hand, in a case where the input amplitude value is not greater than the threshold value L1', the comparator 418 outputs a determination value (for example, zero) that indicates that the input amplitude value is not greater than the threshold value L1'. In the same manner, the comparator 420 compares the input amplitude values to the threshold value L2' and determines whether or not the input amplitude values are greater than the threshold value L2'.

The determination values output from the plurality of comparators 418 and 420 are input to the data determination portion 422. The data determination portion 422 determines the bit value indicated by the input data based on the determination values output from the plurality of comparators 418 and 420. At this time, the data determination portion 422 refers to the determination table for data determination (refer to FIG. 18) that is stored in the storage portion 424, and based on this determination table, determines the bit value indicated by the input data. For example, the table shown in FIG. 18 is used as the determination table for data determination. As shown in the example in FIG. 18, in the determination table, a bit value (zero or 1) is associated with each combination of the values that are output from the plurality of comparators 418 and 420.

Consider, for example, a case in which the output value from the comparator 418 is 1. In this case, the input amplitude value is greater than the threshold value L1'. As explained above, the relationship among the threshold values is defined as L1'>L2'. Based on this relationship, the output value from the comparator 420 must also be 1. Referring to (A) in FIG. 19, the bit value that corresponds to the amplitude value that has a value greater than the threshold value L1' (1>L1'>0) is 1. Therefore, a bit value of 1 is associated with the combination in which all of the output values from the comparators 418 and 420 are 1.

Consider other conditions as well. For the purposes of this discussion, the output values from the comparators 418 and 420 are respectively called d1' and d2', and the combination of the output values is expressed as (d1', d2'). For example, if the combination (d1', d2') is (0, 1), it means that an input data value d satisfies the condition L1'>d>L2'. Referring to (A) in FIG. 19, in a case where the input data value d satisfies the condition L1>d>L2, the bit value is zero. Further, if the combination (d1', d2') is (0, 0), it means that the input data value d satisfies the condition L2'>d. Referring to (A) in FIG. 19, in a case where the input data value d satisfies the condition L2'>d, the bit value is 1.

In this manner, the combinations of the output values that are output individually from the comparators 418 and 420 can be associated with specific bit values. The determination table that is shown in FIG. 18 is an example of the correspondence relationships between the combinations and the bit values, summarized in the form of a table. The data determination portion 422 refers to this sort of determination table and determines the bit values based on the combinations of the output values that are output from the plurality of comparators 418 and 420. The bit values that are determined by the data determination portion 422 are input to the S/P conversion portion 176.

An important point here is that the number of the comparators used for bit value determination is reduced to two. In the case of the decoder 334 shown in FIG. 13, four comparators are used for bit value determination. Therefore, as compared to the decoder 334, the number of the comparators is reduced by half. The reduction by half of the number of the comparators significantly reduces power consumption in a data restoring process. Further, the reduction by half of the number of the comparators significantly reduces the circuit scale. In addition, the load on the determination process performed by the data determination portion 422 is reduced by the reduction in the number of combinations (refer to FIG. 18) of the determination results to be selected by the data determination portion 422. As a result, low power consumption and high-speed processing are achieved with a relatively small-scale circuit configuration.

Signal Processing Method

Next, the overall flow of a signal processing method according to the present embodiment will be briefly described with reference to FIG. 19. FIG. 19 is an explanatory figure that shows the overall flow of the signal processing method according to the present embodiment.

As shown in FIG. 19, first, transmission data is encoded in the serializer 134 based on a specified encoding method, and the code (A) is generated. In this example, the transmission data is encoded by the AMI code method. Next, the serializer 134 adds the code (A) and the clock (B) (step S1), and the code (C) of the new method is generated. The code (C) is transmitted from the serializer 134 to the deserializer 138. Then, the deserializer 138 regenerates the clock (D) from the received code (C) of the new method (step S2). Further, the regenerated clock (D) is subtracted from the code (C) of the new method, and the code (E) is generated (step S3). The deserializer 138 determines the bit value of the data based on the code (E) obtained by subtracting the regenerated clock (D), and decodes the data.

This completes the description of the overall flow of the signal processing method according to the present embodiment. The clock can be regenerated from the code (C) in the deserializer 138 by transmitting data using the code (C) of the new method. Therefore, the PLL does not need to be provided in the deserializer 138, and power consumption can be reduced. In addition, because the code (C) does not contain a direct current component, data can be transmitted through one coaxial cable by superposing it on a DC power supply. Moreover, the number of amplitude values corresponding to each bit value is reduced by subtracting the regenerated clock (D) from the code (C) of the new method. Thus, the number of the threshold values used for bit value determination can be reduced. As a result, it is possible to reduce the circuit scale used for a data decoding process, increase efficiency of the decoding process, reduce the extent to which highly accurate threshold value setting is necessary, and increase data determination accuracy.

Effects

Figure 20:
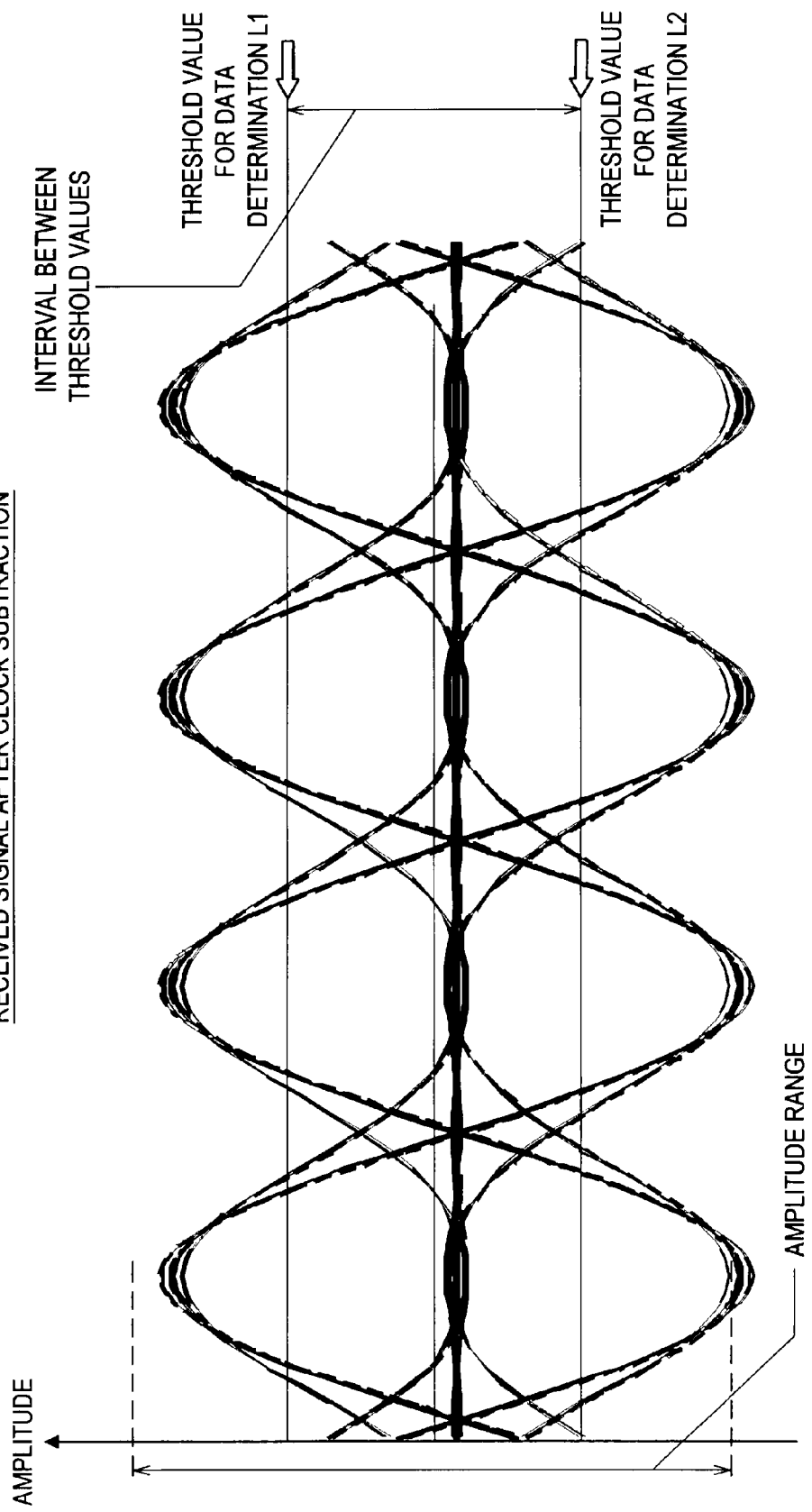
FIG. 20 is an explanatory figure that shows an eye pattern after clock subtraction according to the embodiment.

Next, while comparing FIG. 15 and FIG. 20, effects obtained by applying the technology of the present embodiment will be briefly described. FIG. 20 is an explanatory figure that shows an eye pattern of a received signal obtained by subtracting the regenerated clock (D) from the code (C) of the new method. Note that a display cycle of the eye pattern shown in FIG. 15 differs from that shown in FIG. 20. For this reason, the comparison between FIG. 15 and FIG. 20 is performed focusing on amplitude values.

First, refer to FIG. 15. FIG. 15 is an explanatory figure that shows the signal waveforms that are obtained when the code (C) of the new method is received. As described earlier, in the code (C) of the new method, each bit value is expressed by a plurality of amplitude values. Therefore, in order to determine each bit value from the code (C) of the new method, as many as five threshold values (L0, L1, L2, L3, L4), including the threshold value L0 for clock determination, are required. Further, as shown in FIG. 15, the intervals between the respective threshold values are very narrow. As a result, high setting accuracy is required when the threshold values are set.

It can be seen from FIG. 20 that the bit value of the code (E) obtained by subtracting the regenerated clock (D) from the code (C) of the new method can be determined based on only two threshold values L1' and L2' for data determination. Further, it can be seen that the interval between the threshold values L1' and L2' for data determination is much larger than the intervals between the respective threshold values shown in FIG. 15. Note that, when a signal is transmitted from the serializer 134 to the deserializer 138, the signal is transmitted using the code (C) of the new method. Therefore, all the effects obtained by the code (C) of the new method can be obtained. In addition to the effects, when the technology of the present embodiment is applied, it is possible to reduce the extent to which highly accurate threshold value setting is necessary, and increase data determination accuracy.

Applied Example

Application to Bidirectional Transmission

Figure 21:
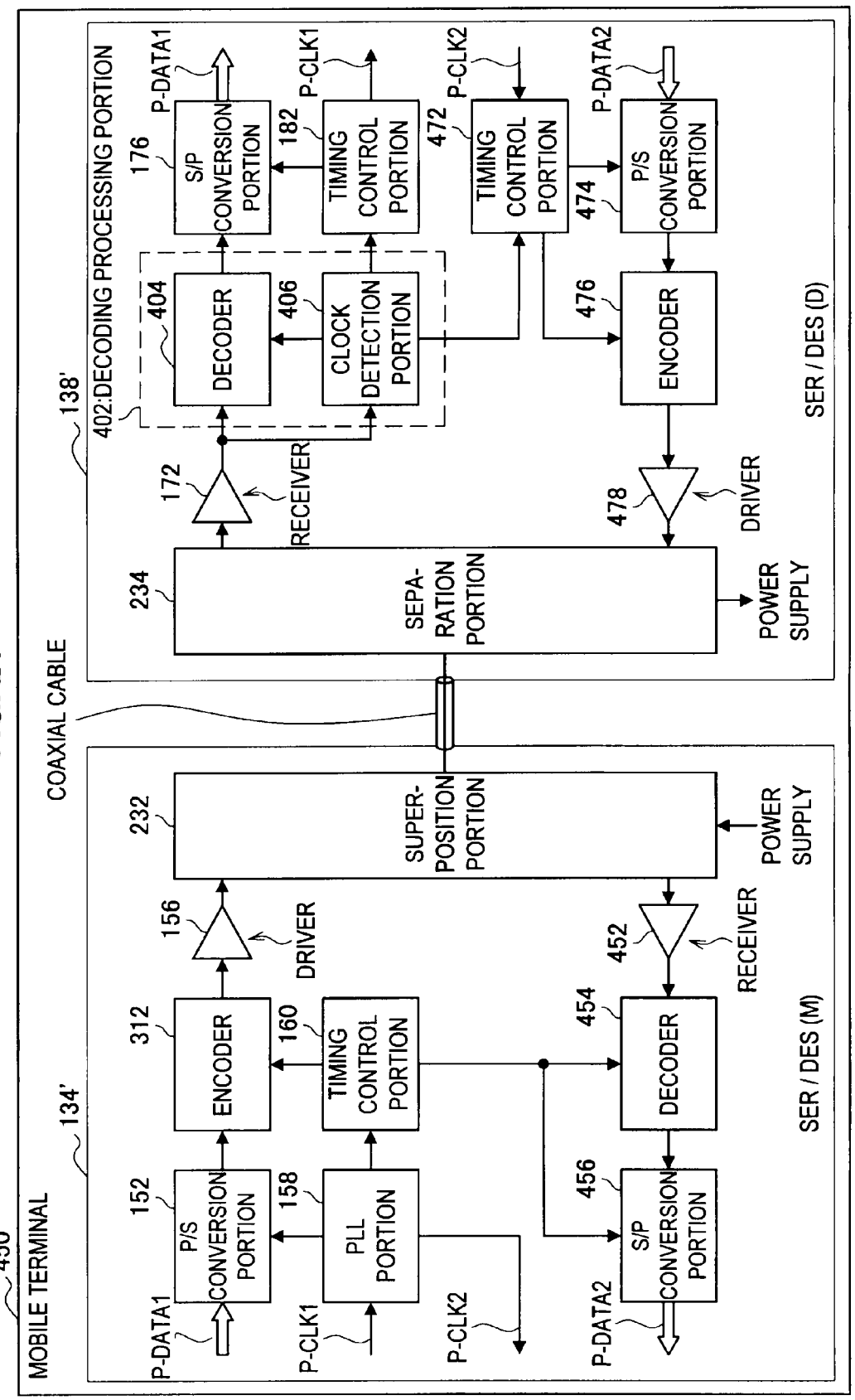
FIG. 21 is an explanatory figure that shows an example of a functional configuration of a mobile terminal according to an applied example of the embodiment.
Figure 22:
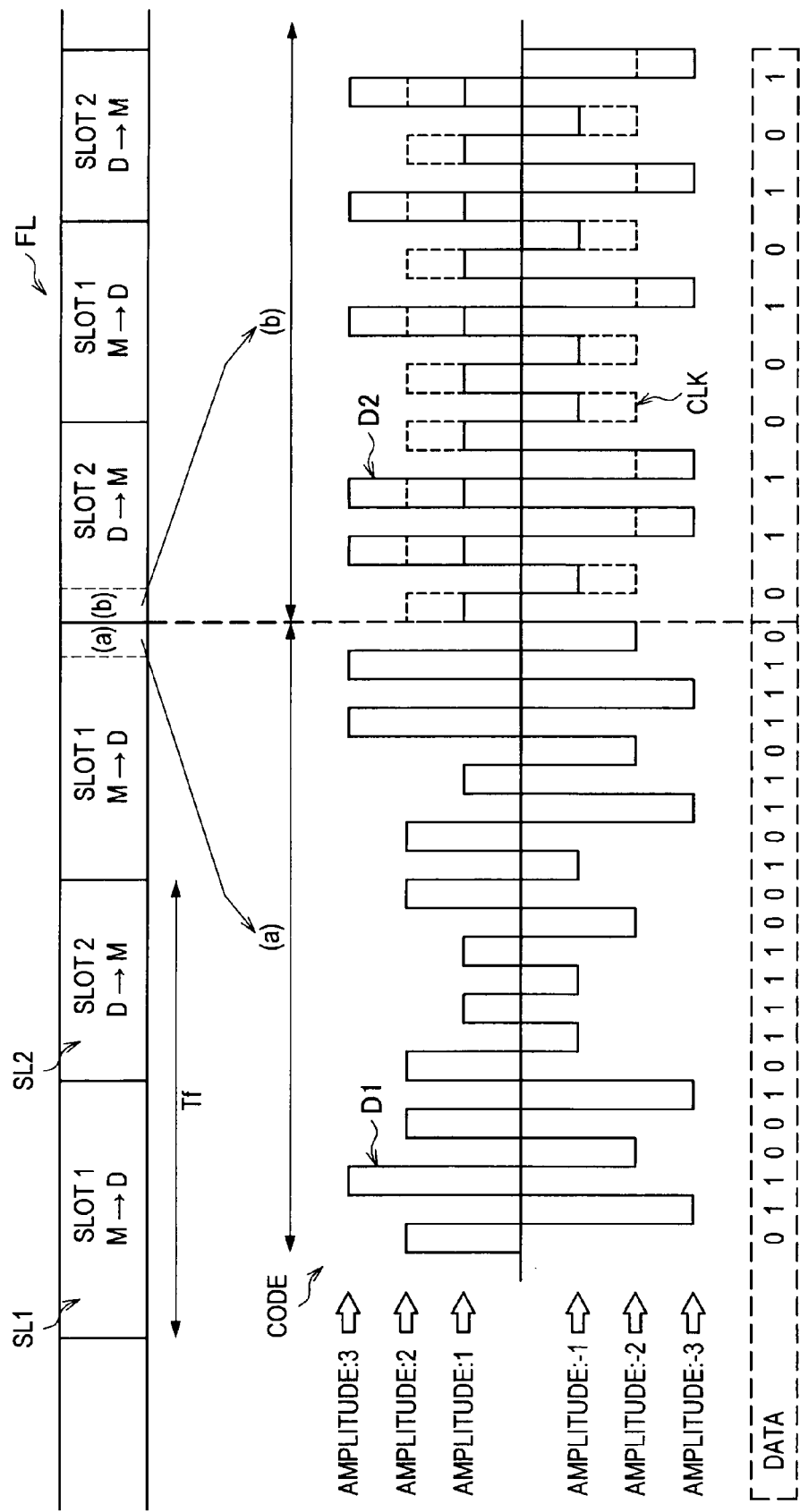
FIG. 22 is an explanatory figure that shows a signal transmission method according to the applied example.

Next, an applied example of the present embodiment will be described with reference to FIG. 21 and FIG. 22. The present applied example is obtained by applying the technology of the present embodiment to a bidirectional transmission method. FIG. 21 is an explanatory figure that shows a functional configuration of a mobile terminal 450 according to the present applied example. FIG. 22 is an explanatory figure that shows a data transmission method for performing bidirectional transmission.

Note that FIG. 21 is the explanatory figure that mainly illustrates the functional configurations of a serializer/deserializer 134' and a serializer/deserializer 138', so descriptions of the other configuring elements are omitted. Note also that configuring elements of the mobile terminal 450 that have substantially the same function as in the mobile terminal 400 that has already been described are denoted by the same reference numerals and detailed explanations are omitted.

Serializer/Deserializer 134' (SER/DES (M))

As shown in FIG. 21, the serializer/deserializer 134' includes the P/S conversion portion 152, the encoder 312, the driver 156, the PLL portion 158, the timing control portion 160, and the superposition portion 232. Further, the serializer/deserializer 134' includes a receiver 452, a decoder 454, and an S/P conversion portion 456.

As shown in FIG. 21, the parallel signal (P-DATA) and the parallel signal clock (P-CLK) are input to the serializer/deserializer 134' from the BBP 110. The parallel signal (P-DATA) that is input to the serializer/deserializer 134' is converted to a serial signal by the P/S conversion portion 152. The serial signal that has been converted by the P/S conversion portion 152 is input to the encoder 312.

The encoder 312 appends a header and the like to the serial signal, and encodes the serial signal using the encoding method of the new method. For example, when the serial signal is expressed by the AMI code method, the serial signal is encoded based on the encoding method shown in FIG. 10. The signal encoded by the encoder 312 is input to the driver 156. The driver 156 inputs to the superposition portion 232 the input serial signal. The superposition portion 232 superposes the signal input from the driver 156 on a power supply line, and transmits it to the serializer/deserializer 138'. For example, the superposition portion 232 may couple the signal and the power supply using a capacitor for the signal and a choke coil for the power supply. Note that a coaxial cable, for example, may be used as the transmission path for the power supply line.

On the other hand, the parallel signal clock (P-CLK) input to the serializer/deserializer 134' is input to the PLL portion 158. The PLL portion 158 generates a serial signal clock from the parallel signal clock (P-CLK), and outputs it to the P/S conversion portion 152 and the timing control portion 160. The timing control portion 160 outputs to the BBP 110 the parallel signal clock (P-CLK) as a parallel signal clock (P-CLK2) corresponding to the received data. Further, the timing control portion 160 controls, based on the input serial signal clock, the transmission timing of the serial signal by the encoder 312. Furthermore, the timing control portion 160 outputs the serial signal clock input from the PLL portion 158 to the decoder 454 and the S/P conversion portion 456.

In order to achieve bidirectional transmission between the serializer/deserializer 134' and the serializer/deserializer 138', time division duplex (TDD) such as that shown in FIG. 22 is used. As shown in FIG. 22, time slots (SL1, SL2) are allocated for each signal transmission direction, and time slots during which signals are transmitted are clearly divided according to the transmission direction.

For example, in the time slot 1 (SL1), transmission is performed only from the serializer/deserializer 134' (M) to the serializer/deserializer 138' (D). Conversely, in the time slot 2 (SL2), transmission is performed only from the serializer/deserializer 138' (D) to the serializer/deserializer 134' (M). However, in the present applied example, even in the time slot 2 (SL2), a serial signal clock (CLK) is transmitted from the serializer/deserializer 134' (M) to the serializer/deserializer 138' (D).

As described below, the serializer/deserializer 138' (D) is not provided with a PLL. Therefore, the serializer/deserializer 138' (D) cannot generate a serial signal clock that is used to transmit a serial signal. For this reason, it is ensured that the serial signal clock is transmitted from the serializer/deserializer 134' (M) even in the time slot 2 (SL2). More specifically, the serializer/deserializer 138' (D) transmits a serial signal using the serial signal clock received from the serializer/deserializer 134' (M).

Refer once again to FIG. 21. When a serial signal is transmitted from the serializer/deserializer 138' to the serializer/deserializer 134', the serial signal is received by the receiver 452 via the superposition portion 232. The serial signal received by the receiver 452 is then input to the decoder 454. Further, the serial signal clock generated by the PLL portion 158 is input to the decoder 454 via the timing control portion 160.

The decoder 454 detects the beginning portion of the data by referring to the header in the input serial signal, and decodes the data based on the encoding method of the encoder 476 included in the serializer/deserializer 138'. At this time, the decoder 454 subtracts, from the serial signal, the clock signal input via the timing control portion 160, and decodes the data based on the amplitude value of the serial signal after the subtraction.

In the same manner as in the above-described mobile terminal 400, the decoder 454 decodes the data based on the decoding method shown in FIG. 19. However, the decoder 454 of the mobile terminal 450 is different from the example shown in FIG. 19 in that it subtracts, from the received serial signal, the serial signal clock generated by the PLL portion 158. The data decoded by the decoder 454 is then input to the S/P conversion portion 456. The S/P conversion portion 456 converts the input serial data to the parallel data (P-DATA). The parallel data converted by the S/P conversion portion 456 is output to the BBP 110.

Serializer/Deserializer 138' (SER/DES (D))

As shown in FIG. 21, the serializer/deserializer 138' mainly includes the receiver 172, the decoder 404, the S/P conversion portion 176, the clock detection portion 406, the timing control portion 182, and the separation portion 234. Note that the decoder 404 and the clock detection portion 406 form the decoding processing portion 402. Further, the serializer/deserializer 138' includes a timing control portion 472, a P/S conversion portion 474, an encoder 476, and a driver 478.

As shown in FIG. 21, the signal in which the serial signal is superposed on the power supply is transmitted to the serializer/deserializer 138' through the power supply line (the coaxial cable). The superposed signal is separated into the serial signal and the power supply by the separation portion 234. For example, the separation portion 234 may extract the serial signal by using a capacitor to cut the direct current component and may extract the power supply by using a choke coil to cut the high-frequency component. The serial signal that has been separated by the separation portion 234 is received by the receiver 172.

The serial signal received by the receiver 172 is input to the decoder 404 and the clock detection portion 406. The clock detection portion 406 detects the clock component in the input serial signal. The clock component is extracted by comparing the amplitude value of the input signal to the threshold value L0 (a potential of zero) and detecting the cycle of the polarity inversion of the amplitude. Therefore, the clock detection portion 406 can detect the clock component of the signal without using a PLL. The clock detected by the clock detection portion 406 is input to the decoder 404 and the timing control portions 182 and 472.

The decoder 404 detects the beginning portion of the data by referring to the header in the input serial signal, and decodes the data based on the encoding method of the encoder 312. At this time, the decoder 404 subtracts, from the serial signal, the clock signal input by the clock detection portion 406, and decodes the data based on the amplitude value of the serial signal after the subtraction.

The data decoded by the decoder 404 is input to the S/P conversion portion 176. The S/P conversion portion 176 converts the input serial data to the parallel data (P-DATA). The parallel data converted by the S/P conversion portion 176 is output to the LCD 104. Note that the timing control portion 182 controls the receiving timing based on the clock input from the clock detection portion 406. Further, the clock (P-CLK) input to the timing control portion 182 is output to the LCD 104.

Further, a parallel signal (P-DATA2) and a parallel signal clock (P-CLK2) are input to the serializer/deserializer 138' from the display portion 102. The parallel signal (P-DATA2) and the parallel signal clock (P-CLK2) input here are input from, for example, an imaging portion or an operation switch provided on the display portion 102, or a camera for a TV phone. The parallel signal (P-DATA2) input to the serializer/deserializer 138' is converted by the P/S conversion portion 474 to a serial signal. The serial signal that has been converted by the P/S conversion portion 474 is input to the encoder 476. The encoder 476 appends a header and the like to the serial signal, and encodes the serial signal using a specified encoding method.

The encoding method used by the encoder 476 need not necessarily be the same as that used by the encoder 312, as long as the code of the encoding method does not contain a direct current component. However, it is necessary to synchronize the code of the encoding method with the serial signal clock that is transmitted from the serializer/deserializer 134' through the coaxial cable. For this reason, the encoder 476 controls the amplitude of the serial signal clock detected by the clock detection portion 406, and encodes the serial signal input from the P/S conversion portion 474. The signal encoded by the encoder 476 is input to the driver 478.

The driver 478 synchronizes the input serial signal with the serial signal clock, and inputs it to a superposition/separation portion 234'. The separation portion 234 superposes the signal input from the driver 478 on the power supply line, and transmits it to the serializer/deserializer 134'. On the other hand, the parallel signal clock (P-CLK2) that has been input to the serializer/deserializer 138' is input to the timing control portion 472. The parallel signal clock (P-CLK2) is converted to a serial signal clock by the P/S conversion portion 474, and input to the encoder 476. Then, the serial signal clock is used to control the transmission timing of serial signals.

This completes the description of the functional configuration of the mobile terminal 450 according to the present applied example. One key feature of the present applied example is that a clock is constantly transmitted from the serializer/deserializer 134' (M) to the serializer/deserializer 138' (D). Further, another key feature of the present applied example is that the serializer/deserializer 138' (D) uses the received clock to transmit a serial signal. Furthermore, another key feature of the present applied example is that the serial signal transmitted from the serializer/deserializer 134' (M) is encoded by the above-described new method. In addition to all the effects obtained by applying the present embodiment, the combination of these features allows realization of an extremely favorable effect, namely, that bidirectional transmission is achieved without providing a PLL in the serializer/deserializer 138' (D).

Summary

In closing, the functional configuration of the mobile terminal according to the present embodiment and the operational effects that are provided by the functional configuration will be briefly summarized. The mobile terminal includes a first information processing module that is equivalent to the operation portion 108 and a second information processing module that is equivalent to the display portion 102.

The first information processing module functions to transmit a signal in which input data that contains first and second bit values that differ from one another is encoded such that the first bit value is expressed by a plurality of first amplitude values and the second bit value is expressed by a plurality of second amplitude values that differ from the first amplitude values. The input data is also encoded such that the same amplitude value does not occur twice in succession and such that the polarities of the amplitude values are inverted with each cycle. Further, the first information processing module functions to transmit a clock signal that is used when the input data is encoded.

The second information processing module includes a signal receiving portion, a clock signal extraction portion, a clock signal subtraction portion, and an input data decoding portion. The above-described separation portion 234 and the receiver 172 are an example of the signal receiving portion. Further, the above-described clock detection portion 406 is an example of the clock signal extraction portion. Furthermore, the above-described decoder 404 is an example of the clock signal subtraction portion and the input data decoding portion.

The above-described signal receiving portion receives a signal in which input data that contains first and second bit values that differ from one another is encoded such that the first bit value is expressed by a plurality of first amplitude values and the second bit value is expressed by a plurality of second amplitude values that differ from the first amplitude values. The input data is also encoded such that the same amplitude value does not occur twice in succession and such that the polarities of the amplitude values are inverted with each cycle. Further, the above-described clock signal extraction portion extracts a clock signal by detecting polarity inversions in the signal received by the signal receiving portion.

As described above, the signal received by the signal receiving portion is encoded by the format that does not contain a direct current component and that can extract a clock signal by utilizing polarity inversion. Therefore, it is possible to transmit the signal by superposing it on a DC power supply or the like. For example, the above-described signal can be transmitted by using one power supply line as a transmission path. Further, the above-described signal is configured such that the clock can be extracted by utilizing polarity inversion. In response to this, the above-described mobile terminal is configured such that the clock signal extraction portion extracts the clock. Therefore, the PLL or the like used to generate the clock does not need to be provided in the second information processing module. As a result, power consumption of the mobile terminal can be reduced. In addition, the circuit scale of the mobile terminal can be reduced.

The above-described clock signal subtraction portion subtracts, from the signal received by the signal receiving portion, the clock signal that is extracted by the clock signal extraction portion. The above-described input data decoding portion determines the first and second bit values based on the amplitude value of the signal obtained by the clock signal subtraction portion subtracting the clock signal, and decodes the above-described input data.

As described above, in the signal received by the signal receiving portion, each bit value is expressed by a plurality of amplitude values. Therefore, in order to determine each bit value from the received signal, a large number of threshold values are required. However, as described above, because the clock signal subtraction portion subtracts the clock signal from the received signal, the number of the amplitude values used to express each bit value can be reduced. Thus, the number of the threshold values used to determine each bit value can be reduced. Further, because the interval between each of the threshold values is increased, such highly accurate threshold value setting is less necessary. In addition, the number of the comparators used in the determination process can be reduced by the reduced number of the threshold values. Thus, the circuit scale can be reduced. Moreover, the number of combinations of the determination values obtained by the comparators is reduced. Thus, the computing load on the bit value determination process, which is performed based on the combinations, is reduced.

In the signal received by the signal receiving portion, the first bit value may be expressed by an amplitude value of zero, and the second bit value may be obtained by adding a clock signal to an encoded signal X with a transmission speed of Fb that is expressed by repetition of amplitude values A and −A, where A is a given real number, the clock signal having an amplitude value of n*A, where n is larger than one, and having a frequency of Fb/2. When this sort of code is received, the original signal before the addition is almost regenerated by subtracting the clock signal. Further, the clock signal extraction portion may be a comparator that has, as a threshold value, a median amplitude value of the signal that has been obtained by the clock signal subtraction portion subtracting the clock signal. The polarity inversion can be detected by setting the median amplitude value as the threshold value, and the clock signal is thereby detected.

The input data decoding portion may include: a first comparator that determines whether the amplitude value of the signal that has been obtained by the clock signal subtraction portion subtracting the clock signal is larger than a threshold value L1, where L1 is larger than zero and equal to or smaller than A; and a second comparator that determines whether the amplitude value of the signal is larger than a threshold value L2, where L2 is equal to or larger than −A and smaller than zero. The input data decoding portion may decode the input data by determining one of the first bit value and the second bit value in accordance with combination of determination results by the first and second comparators. In this manner, by using the signal that has been obtained by subtracting the clock signal, each bit value can be determined by only two comparators.

The second information processing module may further include a signal transmission portion that transmits, in synchronization with the clock signal extracted by the clock signal extraction portion, a signal in which input data that contains third and fourth bit values that differ from one another is encoded such that the third bit value is expressed by a plurality of third amplitude values and the fourth bit value is expressed by a plurality of fourth amplitude values that differ from the third amplitude values, the input data also being encoded such that the same amplitude value does not occur twice in succession and such that the polarities of the amplitude values are inverted with each cycle. The encoder 476, the driver 478 and the separation portion 234 that are described above are an example of the signal transmission portion.

Because the signal transmission portion is provided in this manner, the signal can be transmitted in the reverse direction with respect to the first information processing module.

The clock signal extraction portion may include an amplitude adjusting portion that adjusts the amplitude value of the clock signal to n*A. The above-described amplifier 414 is an example of the amplitude adjusting portion. With this configuration, the clear clock signal, which is obtained by adjusting the distortion of the clock signal generated during transmission, can be used for the subtraction process and the like. As a result, the bit value determination accuracy can be prevented from being reduced by the distortion of the clock signal.

Further, the first and second information processing modules can also be expressed as follows.

The first information processing module includes: a clock signal generating portion that generates a clock signal that is used to transmit a signal; an encoding portion that generates, by using the clock signal generated by the clock signal generating portion, a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle; and a signal transmission portion that transmits the signal generated by the encoding portion to a second information processing module.

Further, the first information processing module includes: a signal receiving portion that receives the signal transmitted from the second information processing module; a clock signal subtraction portion that subtracts, from the signal received by the signal receiving portion, the clock signal generated by the clock signal generating portion; and a bit value determination portion that determines third and fourth bit values that differ from one another, based on an amplitude value of the signal that has been obtained by the clock signal subtraction portion subtracting the clock signal. With this configuration expressed as described above, the first information processing module does not extract the clock signal from the signal received from the second information processing module. Instead, the first information processing module subtracts from the received signal the clock signal generated by itself. This is because the second information processing module transmits the signal using the clock signal that has been transmitted from the first information processing module, which will be described later. With this configuration, the circuit scale can be reduced, and the power consumption can also be reduced.

The second information processing module includes: a signal receiving portion that receives the signal transmitted from the first information processing module; a clock signal extraction portion that extracts a clock signal by detecting polarity inversions in the signal received by the signal receiving portion; and a signal transmission portion that transmits to the first information processing module, in synchronization with the clock signal extracted by the clock signal extraction portion, a signal in which input data that contains third and fourth bit values that differ from one another is encoded such that the third bit value is expressed by a plurality of third amplitude values and the fourth bit value is expressed by a plurality of fourth amplitude values that differ from the third amplitude values, the input data also being encoded such that the same amplitude value does not occur twice in succession and such that the polarities of the amplitude values are inverted with each cycle.

[Hardware Configuration]

Figure 23:
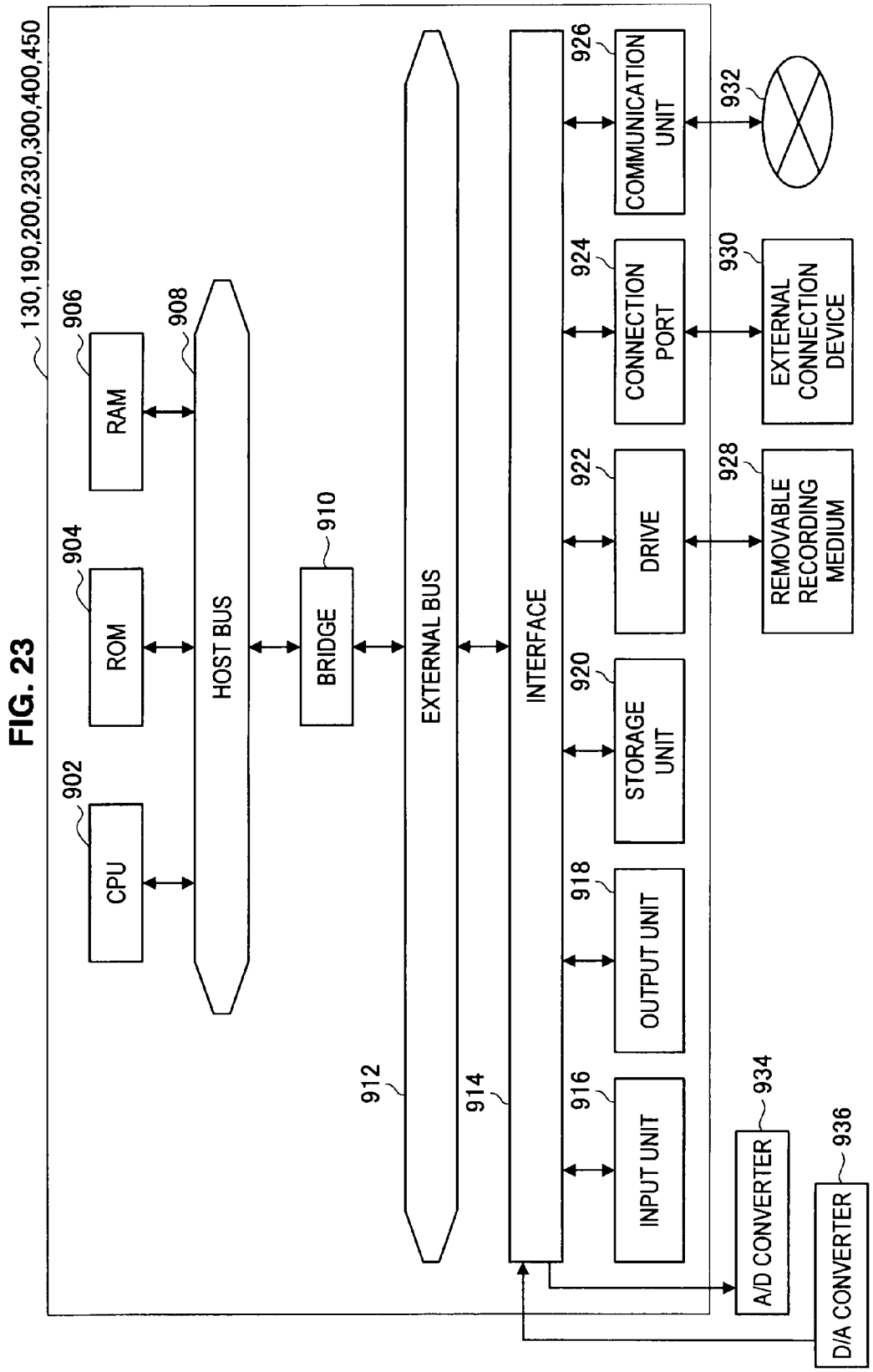
FIG. 23 is an explanatory figure that shows an example of a hardware configuration of an information processing device such as a mobile terminal.

The functions of the constituent elements held by the terminal can be realized by an information processing apparatus having, for example, a hardware configuration shown in FIG. 23. FIG. 23 is a diagram for explaining a hardware configuration of an information processing apparatus which can realize the functions held by the constituent elements of the apparatus.

Note that the forms that the information processing device may take include, for example, a portable information terminal, such as a personal computer, a mobile telephone, a Personal Handyphone System (PHS), a personal digital assistant (PDA), or the like, as well as a game device, various types of smart household appliances, and the like.

As shown in FIG. 23, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used.

The network 932 connected to the communication unit 926 includes a wiredly or wirelessly connected network. For example, the Internet, a home-use LAN, infrared communication, broadcasting, satellite communication, or the like is used.

Further, an AD conversion unit 934 and a DA conversion unit 936 are connected to the interface 914. The AD conversion unit 934 converts the input analog signal to a digital signal, and outputs it to the interface 914. The DA conversion unit 936 converts the digital signal input from the interface 914 to an analog signal, and outputs it.

It should be understood by those skilled in the art that various modifications, combinations, sub-combinations and alterations may occur depending on design and other factors insofar as they are within the scope of the appended claims or the equivalents thereof.

For example, the embodiment that is described above was explained using the AMI code as an example of the code that is input to the adder ADD, but the technology of the present invention is not limited to this example. As has already been described, various types of bipolar codes and codes according to partial response methods, such as PR (1, −1), PR (1, 0, −1), PR (1, 0, . . . , 0, −1), and the like, can also be used. It is preferable to use a code format that utilizes polarity inversion, as these examples do. These sorts of codes can be generated by bit shifting and the like. Any number of modified examples of this sort of code generation method can be envisioned.

The present application contains subjected matter related to that disclosed in Japanese Priority Patent Application JP 2008-198395 filed in the Japan Patent Office on Jul. 31, 2008, the entire contents of which is hereby incorporated by reference.

What is claimed is:

1. An information processing device, comprising:
   a signal receiving portion that receives a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle;
   a clock signal extraction portion that extracts a clock signal by detecting polarity inversions in the signal received by the signal receiving portion;
   a clock signal subtraction portion that subtracts, from the signal received by the signal receiving portion, the clock signal extracted by the clock signal extraction portion; and
   an input data decoding portion that decodes the input data by determining the first and second bit values based on an amplitude value of the signal that has been obtained by the clock signal subtraction portion subtracting the clock signal.

2. The information processing device according to claim 1, wherein
   in the signal received by the signal receiving portion, the first bit value is expressed by an amplitude value of zero, and the second bit value is obtained by adding a clock signal to an encoded signal X with a transmission speed of Fb that is expressed by repetition of amplitude values A and −A, where A is a given real number, the clock signal having an amplitude value of n*A, where n is larger than one, and having a frequency of Fb/2.

3. The information processing device according to claim 2, wherein
   the clock signal extraction portion is a comparator that has, as a threshold value, a median amplitude value of the signal that has been obtained by the clock signal subtraction portion subtracting the clock signal.

4. The information processing device according to claim 3, wherein
   the input data decoding portion includes:
      a first comparator that determines whether the amplitude value of the signal that has been obtained by the clock signal subtraction portion subtracting the clock signal is larger than a threshold value L1, where L1 is larger than zero and equal to or smaller than A; and
      a second comparator that determines whether the amplitude value of the signal is larger than a threshold value L2, where L2 is equal to or larger than −A and smaller than zero, and wherein
   the input data decoding portion decodes the input data by determining one of the first bit value and the second bit value in accordance with combination of determination results of the first and second comparators.

5. The information processing device according to claim 4, further comprising:
   a signal transmission portion that transmits, in synchronization with the clock signal extracted by the clock signal extraction portion, a signal in which input data that contains third and fourth bit values that differ from one another is encoded such that the third bit value is expressed by a plurality of third amplitude values and the fourth bit value is expressed by a plurality of fourth amplitude values that differ from the third amplitude values, the input data also being encoded such that the same amplitude value does not occur twice in succession and such that the polarities of the amplitude values are inverted with each cycle.

6. The information processing device according to claim 2, wherein
   the clock signal extraction portion includes an amplitude adjusting portion that adjusts the amplitude value of the clock signal to n*A.

7. An information processing device, comprising:
   a first information processing module that includes
      a clock signal generating portion that generates a clock signal that is used to transmit a signal,
      an encoding portion that generates, by using the clock signal generated by the clock signal generating portion, a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle,
- a signal transmission portion that transmits the signal generated by the encoding portion to a second information processing module,
- a signal receiving portion that receives the signal transmitted from the second information processing module,
- a clock signal subtraction portion that subtracts, from the signal received by the signal receiving portion, the clock signal generated by the clock signal generating portion, and
- a bit value determination portion that determines third and fourth bit values that differ from one another, based on an amplitude value of the signal that has been obtained by the clock signal subtraction portion subtracting the clock signal; and the second information processing module that includes
- a signal receiving portion that receives the signal transmitted from the first information processing module,
- a clock signal extraction portion that extracts a clock signal by detecting polarity inversions in the signal received by the signal receiving portion, and
- a signal transmission portion that transmits to the first information processing module, in synchronization with the clock signal extracted by the clock signal extraction portion, a signal in which input data that contains third and fourth bit values that differ from one another is encoded such that the third bit value is expressed by a plurality of third amplitude values and the fourth bit value is expressed by a plurality of fourth amplitude values that differ from the third amplitude values, the input data also being encoded such that the same amplitude value does not occur twice in succession and such that the polarities of the amplitude values are inverted with each cycle.

8. A signal processing method, comprising the steps of:
receiving a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle;
extracting a clock signal by detecting polarity inversions in the received signal;
subtracting the extracted clock signal from the received signal; and
decoding the input data by determining the first and second bit values based on the signal that has been obtained by subtracting the clock signal.

9. A signal transmission method, comprising the steps of:
generating a clock signal that is used to transmit a signal, the clock signal being generated by a first information processing module;
generating, by using the generated clock signal, a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle, the signal being generated by the first information processing module;
transmitting the generated signal to a second information processing module, the signal being transmitted by the first information processing module;
receiving the signal that has been transmitted by the first information processing module, the signal being received by the second information processing module;
extracting the clock signal by detecting polarity inversions in the received signal, the clock signal being extracted by the second information processing module;
transmitting to the first information processing module, in synchronization with the extracted clock signal, a signal in which input data that contains third and fourth bit values that differ from one another is encoded such that the third bit value is expressed by a plurality of third amplitude values and the fourth bit value is expressed by a plurality of fourth amplitude values that differ from the third amplitude values, the input data also being encoded such that the same amplitude value does not occur twice in succession and such that the polarities of the amplitude values are inverted with each cycle, the signal being transmitted by the second information processing module;
receiving the signal that has been transmitted by the second information processing module, the signal being received by the first information processing module;
subtracting the generated clock signal from the signal that has been transmitted by the second information processing module, the clock signal being subtracted by the first information processing module; and
determining the third and fourth bit values that differ from one another, based on an amplitude value of the signal that has been obtained by the first information processing module subtracting the clock signal, the third and fourth bit values being determined by the first information processing module.

* * * * *